US011806867B2

(12) United States Patent
Iida et al.

(10) Patent No.: US 11,806,867 B2
(45) Date of Patent: Nov. 7, 2023

(54) PROFILING APPARATUS

(71) Applicant: KONICA MINOLTA, INC., Chiyoda-ku (JP)

(72) Inventors: Shinichi Iida, Sakai (JP); Shigeaki Tochimoto, Ibaraki (JP); Hiroshi Takaoka, Yao (JP)

(73) Assignee: KONICA MINOLTA, INC., Tokyo (JP)

( * ) Notice: Subject to any disclaimer, the term of this patent is extended or adjusted under 35 U.S.C. 154(b) by 762 days.

(21) Appl. No.: 16/968,497

(22) PCT Filed: Jan. 18, 2019

(86) PCT No.: PCT/JP2019/001368
§ 371 (c)(1),
(2) Date: Aug. 7, 2020

(87) PCT Pub. No.: WO2019/155845
PCT Pub. Date: Aug. 15, 2019

(65) Prior Publication Data
US 2020/0406484 A1 Dec. 31, 2020

(30) Foreign Application Priority Data

Feb. 9, 2018 (JP) .................................. 2018-021585

(51) Int. Cl.
*G01B 5/20* (2006.01)
*B25J 19/02* (2006.01)
*B25J 9/16* (2006.01)

(52) U.S. Cl.
CPC ............ *B25J 19/021* (2013.01); *B25J 9/1697* (2013.01)

(58) Field of Classification Search
CPC ......... B25J 19/021; B25J 19/02; B25J 9/1697
(Continued)

(56) References Cited

U.S. PATENT DOCUMENTS 4,377,911 A * 3/1983 Iida ........................... G01B 5/20
33/561
5,740,616 A * 4/1998 Seddon ..................... G01D 3/02
33/554

(Continued)

FOREIGN PATENT DOCUMENTS

JP 2002-359263 12/2002
JP 2010-274359 12/2010
(Continued)

*Primary Examiner* — George B Bennett
(74) *Attorney, Agent, or Firm* — Cozen O'Connor

(57) ABSTRACT

A profiling apparatus includes: a holder rotationally moves around a first fulcrum, and holds a subject; a balancer rotationally moves around a second fulcrum, an intermediate part coupled to holder part and balancer, expands and contracts in a coupling direction, and bends in a direction orthogonal to the coupling direction, in which a position of the first fulcrum, a first gravity center position, a bending position, and a second gravity center position are aligned in this order. The first gravity center position corresponds to a gravity center of a part, which rotationally moves around the first fulcrum, of the subject and the holder in a case where the subject is held. The bending position corresponds to a bending point of the intermediate part. The second gravity center position corresponds to a gravity center of a part, which rotationally moves around the second fulcrum, of the second fulcrum position and balancer.

20 Claims, 18 Drawing Sheets

(58) Field of Classification Search
USPC .......................................................... 33/551
See application file for complete search history.

(56) References Cited

U.S. PATENT DOCUMENTS

| | | | | |
|---|---|---|---|---|
| 6,164,124 A * | 12/2000 | Fujii | ........................ | G01B 7/34 33/554 |
| 6,874,243 B2 * | 4/2005 | Hama | ...................... | G01B 5/28 33/551 |
| 6,901,678 B2 * | 6/2005 | Kubota | .................... | G01B 7/34 33/551 |
| 2003/0159302 A1 * | 8/2003 | Dall'Aglio | ............... | G01B 7/12 33/551 |
| 2019/0126486 A1 * | 5/2019 | Hiraguri | ................. | G01B 11/14 |
| 2022/0371292 A1 * | 11/2022 | Petersen | ............... | B29C 70/541 |

FOREIGN PATENT DOCUMENTS

| | | |
|---|---|---|
| JP | 2010-276432 | 12/2010 |
| JP | 2012-235236 | 11/2012 |

\* cited by examiner

PROFILING APPARATUS

RELATED APPLICATIONS

This is a U.S. National Phase Application under 35 USC 371 of International Application PCT/JP2019/001368 filed on Jan. 18, 2019.

This application claims the priority of Japanese application nos. 2018-021585 filed Feb. 9, 2018, the entire content of both of which are hereby incorporated by reference.

TECHNICAL FIELD

The present invention relates to a profiling apparatus that causes a subject surface of a subject to follow a target surface of a target.

BACKGROUND ART

Generally, profiling apparatuses are used in, for example, processing, measurement, and inspection. The profiling apparatuses cause a subject surface of a subject to follow a target surface of a target, preferably, position the subject surface to the target surface such that the target surface and the subject surface is in parallel with each other. For example, Patent Literature 1 discloses such a profiling apparatus.

In the profiling mechanism disclosed in Patent Literature 1, a static pressure air bearing is formed between a slidably holding part and a movable part. The static pressure air bearing uses adsorption force by magnetic force and equalization of static pressure of pressurized air and the self-weight of the movable part. The slidably holding part has a spherical curved surface. The movable part has a spherical curved surface corresponding to the spherical curved surface of the slidably holding part. The movable part includes a sliding part and a profiling part. The sliding part has the spherical curved surface. The profiling part causes the lower surface of the profiling part itself to follow a profiling reference object. The curvature center of the spherical curved surface is on the lower surface. The gravity center of the movable part is made to approach the side of the curvature center by constituting the sliding part with a substance having specific gravity lower than a substance constituting the profiling part.

In the profiling mechanism disclosed in Patent Literature 1, when the profiling mechanism is used in the vertical direction, the position of the curvature center on the spherical curved surface of the movable part and the position of the gravity center of the movable part are positioned on a vertical line, and thus the movable part does not naturally rotate by its own weight with respect to the slidably holding part. Unfortunately, when the profiling mechanism is used in the horizontal direction, the position of the curvature center on the spherical curved surface of the movable part and the position of the gravity center of the movable part do not coincide with each other, and thus the movable part naturally rotates by its own weight with respect to the slidably holding part. In Patent literature 1, the position of the curvature center and the position of the gravity center can be made to coincide with each other by attaching counterweights on both sides, where the target is followed, of the movable part. Unfortunately, when the target is followed in, for example, processing, measurement, and inspection, and when the target and the counterweights interfere with each other, for example, when the counterweights abut on the target, the counterweights cannot be attached.

CITATION LIST

Patent Literature

Patent Literature 1: JP 2010-274359 A

SUMMARY OF INVENTION

The invention has been made in view of the above-described circumstances, and an object of the invention is to provide a profiling apparatus that can be used not only in the vertical direction but in other directions, particularly, in the horizontal direction.

In order to achieve the above-described object, a profiling apparatus reflecting one aspect of the invention causes a subject surface of a subject to follow a target surface of a target, and includes; a holding part that rotationally moves around a first fulcrum, and holds the subject; a balancer part that rotationally moves around a second fulcrum different from the first fulcrum, an intermediate part that is coupled to each of the holding part and the balancer part, expands and contracts in a coupling direction, and bends in a direction orthogonal to the coupling direction, and there, a first fulcrum position of the first fulcrum, a first gravity center position, a bending position, and a second gravity center position are aligned in this order. The first gravity center position corresponds to a gravity center of a part, which rotationally moves around the first fulcrum, of the subject and the holding part in the case where the subject is held. The bending position corresponds to a bending point of the intermediate part. The second gravity center position corresponds to a gravity center of a part, which rotationally moves around the second fulcrum, of the second fulcrum position and the balancer part.

The advantages and features given by one or a plurality of embodiments of the invention are fully understood from the detailed description given below and the accompanying drawings. These detailed descriptions and accompanying drawings are provided by way of example only, and are not intended as limiting definitions of the invention.

DESCRIPTION OF EMBODIMENTS

Hereinafter, one or a plurality of embodiments of the invention will be described with reference to the drawings. The scope of the invention is, however, not limited to the disclosed embodiment. Configurations denoted by the same sign in each figure have the same configuration, and the description thereof will be appropriately omitted. In the present specification, a reference sign without an index is used for generic designation, and a reference sign with an index is used for referring to an individual configuration.

A profiling apparatus in an embodiment causes a subject surface of a subject to follow a target surface of a target. The profiling apparatus includes a holding part, an intermediate part, and a balancer part. The holding part rotationally moves around a first fulcrum, and holds the subject. The intermediate part is coupled to the holding part at one end, and has a degree of freedom except a coupling direction. The balancer part is coupled to the other end of the intermediate part, and rotationally moves around a second fulcrum different from the first fulcrum. In the embodiment, a first fulcrum position of the first fulcrum, a first gravity center position, a bending position, and a second gravity center position are aligned in this order. The first gravity center position corresponds to the gravity center of a part, which rotationally moves around the first fulcrum, of the subject and the holding part in the case where the subject is held. The bending position corresponds to a bending point of the intermediate part. The second gravity center position corresponds to the gravity center of a part, which rotationally moves around the second fulcrum, of the second fulcrum position and the balancer part. Even when the first fulcrum position and the first gravity center position do not coincide with each other and the holding part rotationally moves around the first fulcrum, the balancer part is coupled to the holding part via the intermediate part, so that the rotational movement can be stopped at the position where the subject surface follows the target surface. The profiling apparatus in the embodiment can thus be used not only in the vertical direction but in other directions, particularly in the horizontal direction. Such a profiling apparatus will now be more specifically described below.

Figure 1:
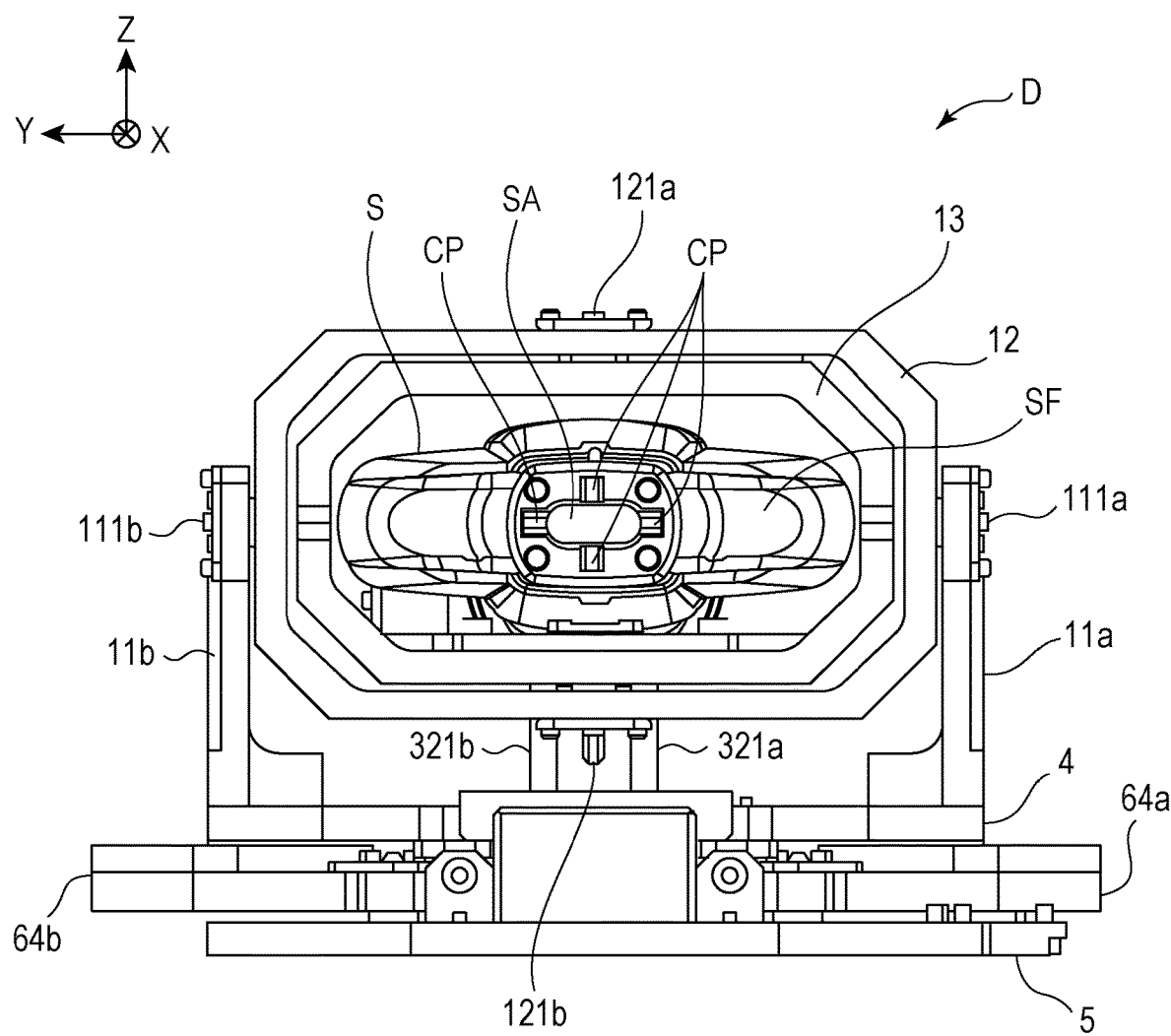
FIG. 1 is a front view of a profiling apparatus in an embodiment.
Figure 2:
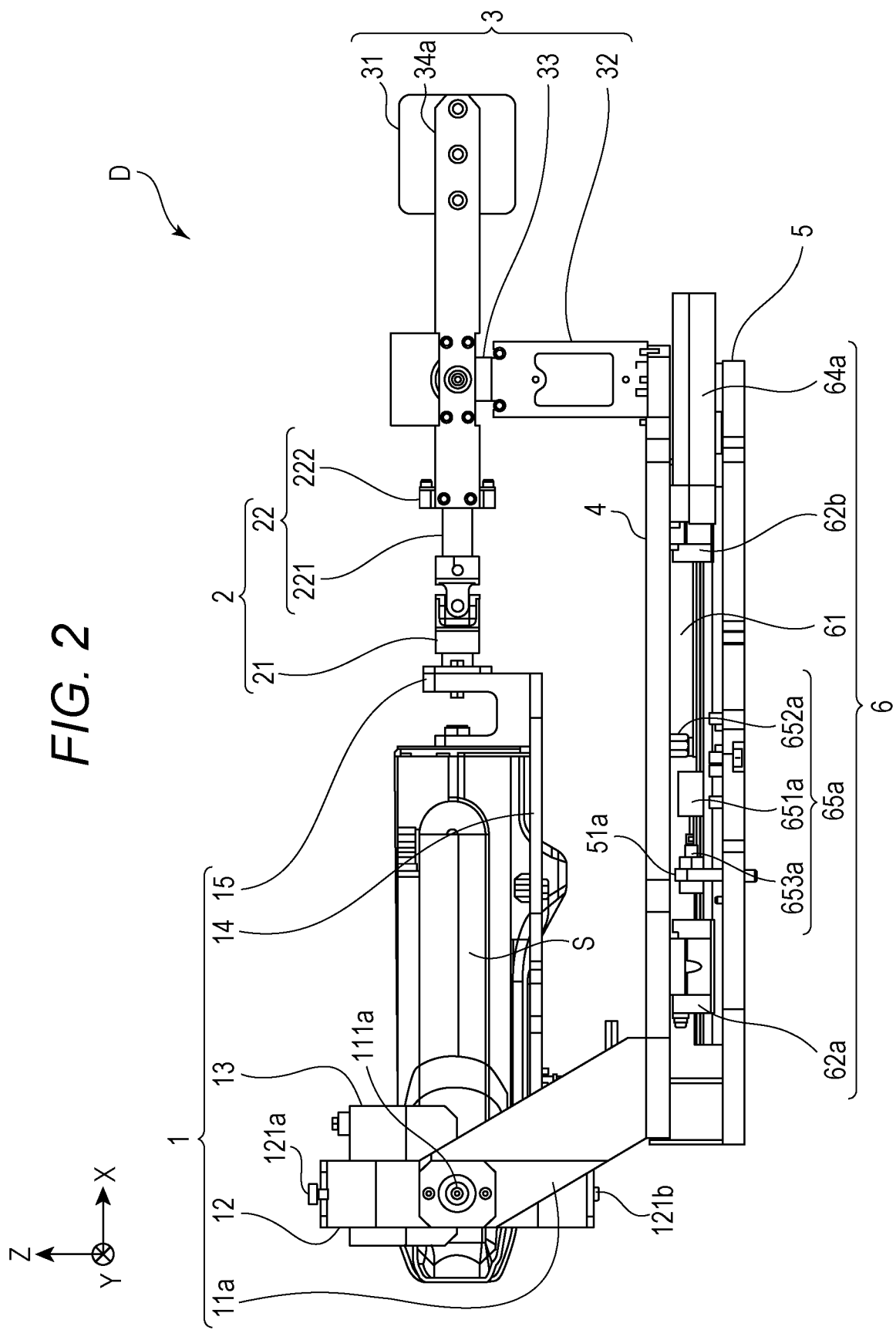
FIG. 2 is a side view of the profiling apparatus in FIG. 1.
Figure 3:
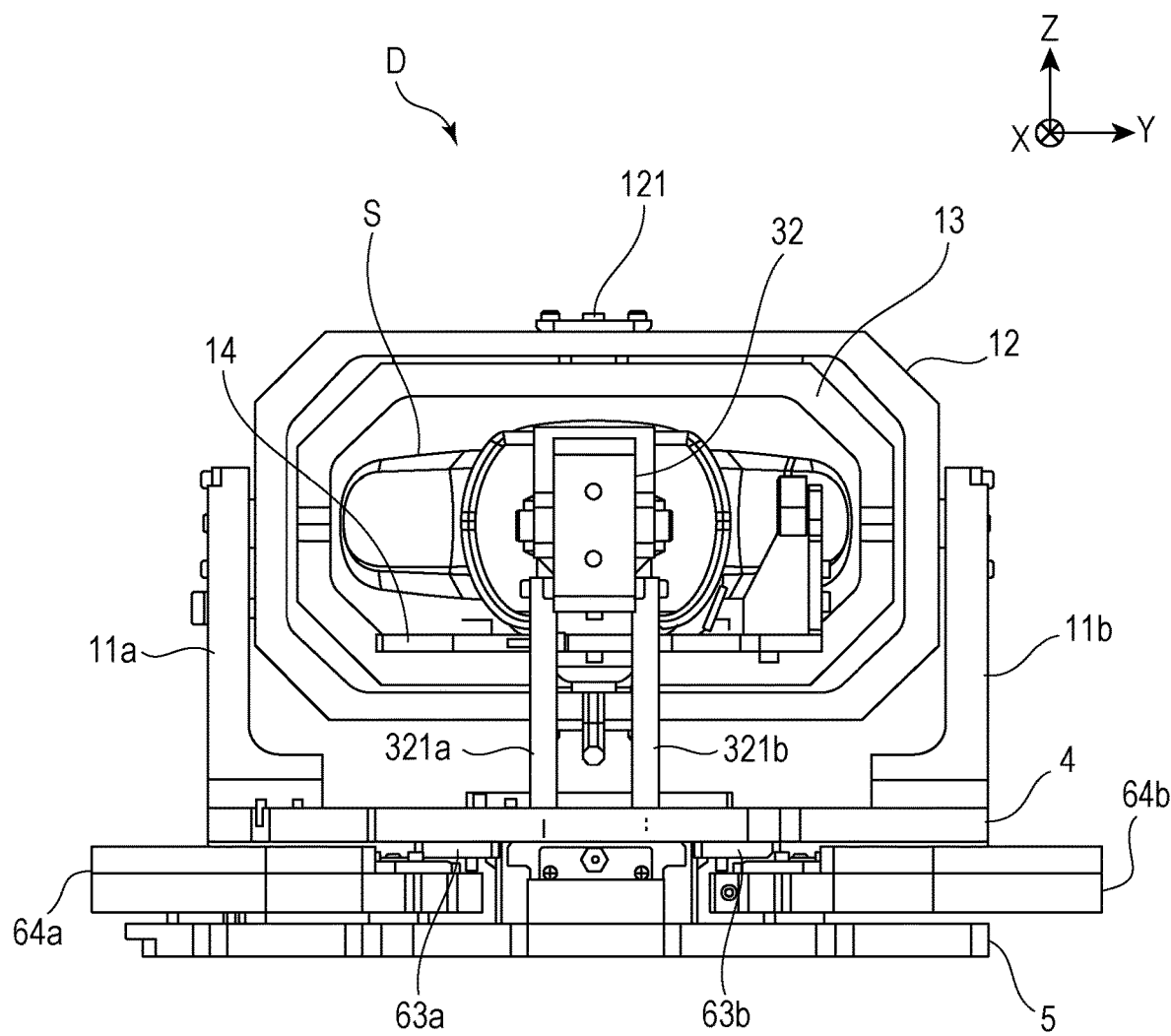
FIG. 3 is a back view of the profiling apparatus in FIG. 1.
Figure 4:
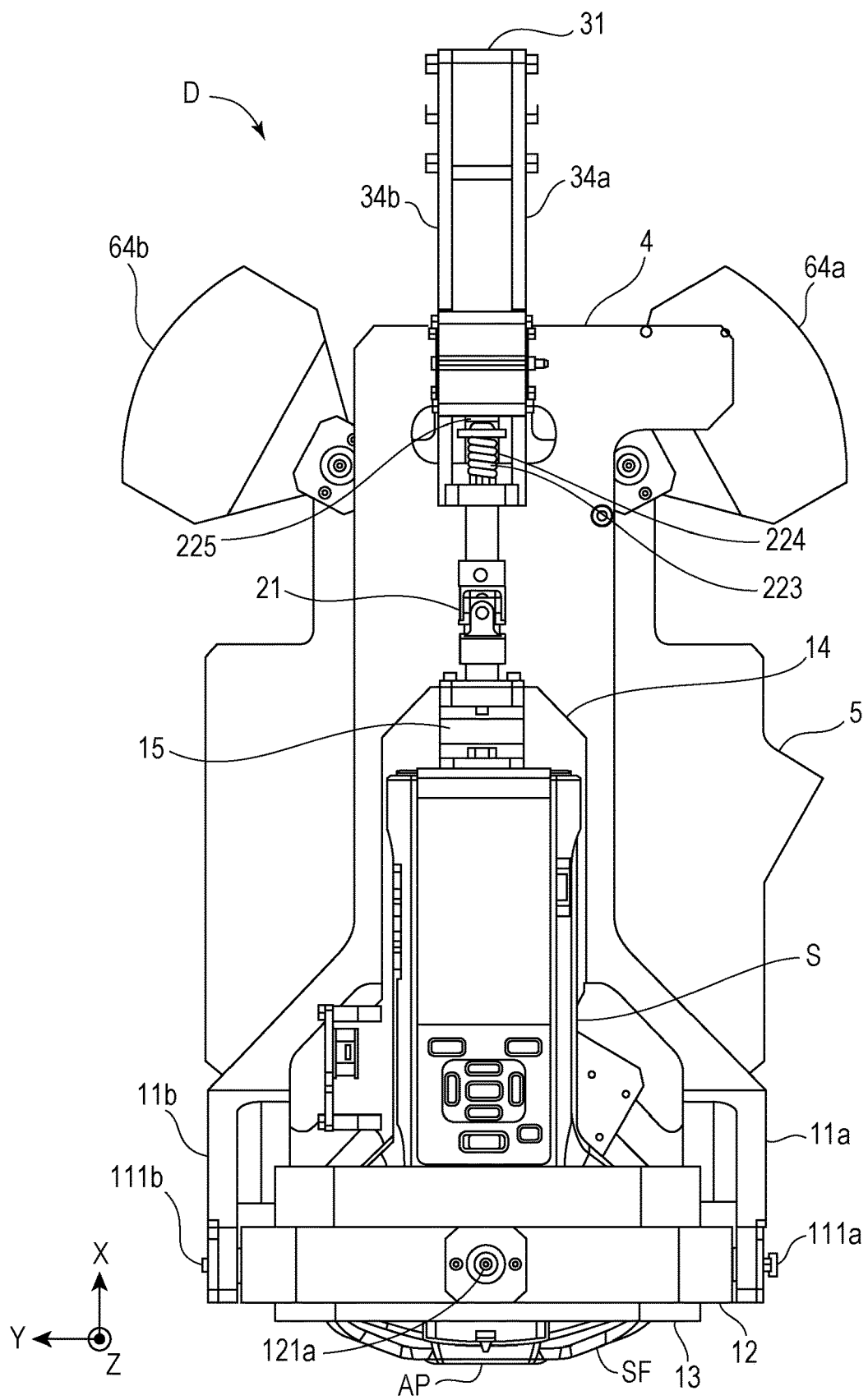
FIG. 4 is a top view of the profiling apparatus in FIG. 1.
Figure 5:
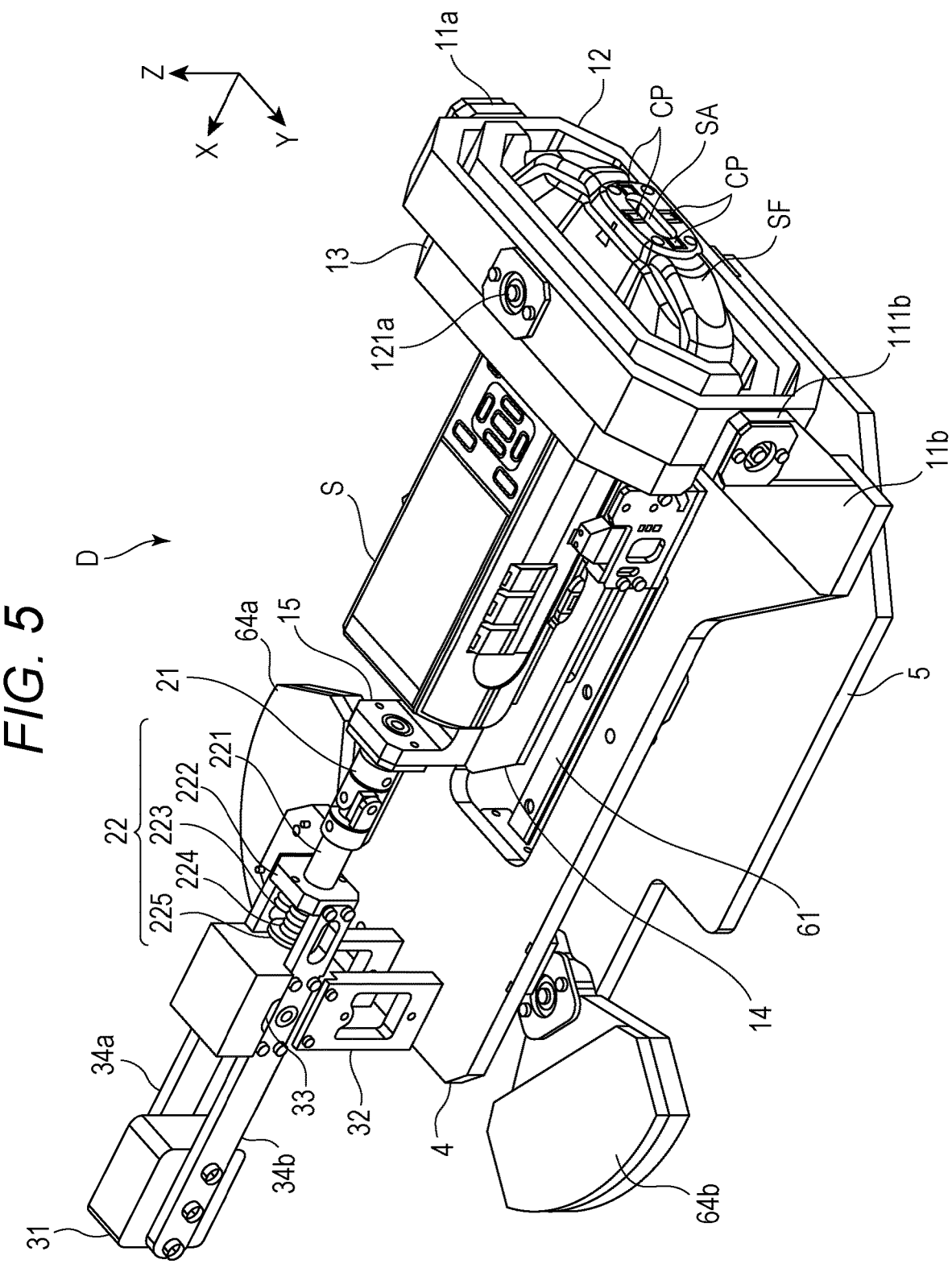
FIG. 5 is a perspective view of the profiling apparatus in FIG. 1.
Figure 6A:
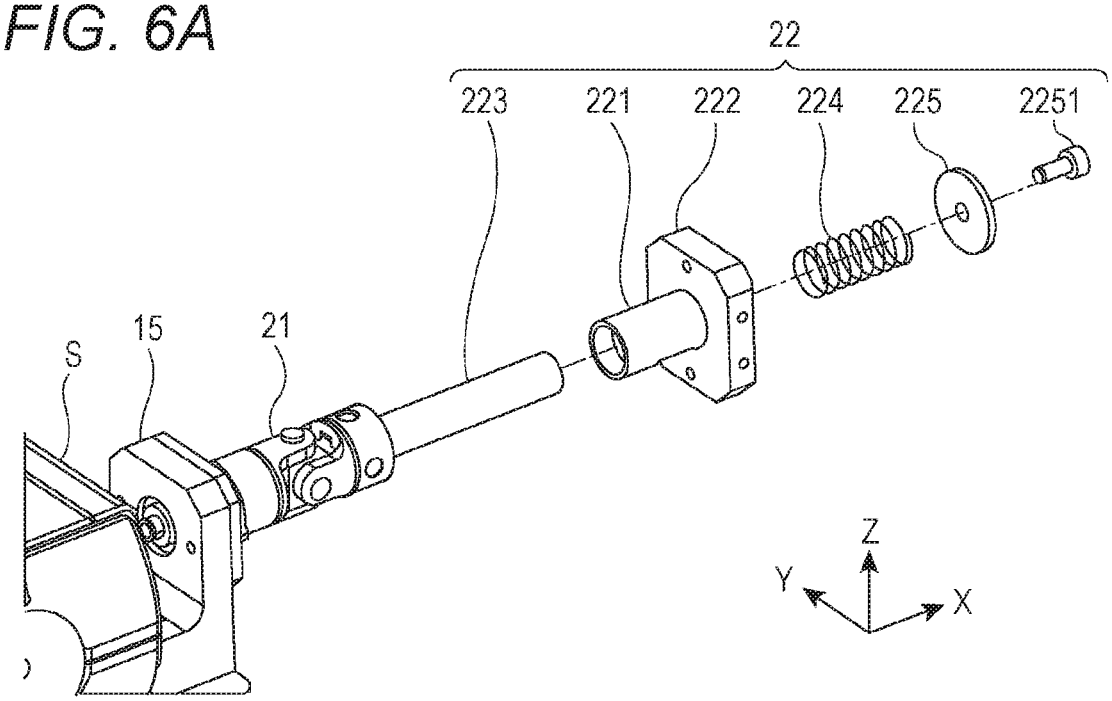
FIG. 6 illustrates the structure of an intermediate part in the profiling apparatus in FIG. 1.

FIG. 1 is a front view of a profiling apparatus in an embodiment. FIG. 2 is a side view of the profiling apparatus in FIG. 1. FIG. 3 is a back view of the profiling apparatus in FIG. 1. FIG. 4 is a top view of the profiling apparatus in FIG. 1. FIG. 5 is a perspective view of the profiling apparatus in FIG. 1. FIG. 6 illustrates the structure of an intermediate part in the profiling apparatus in FIG. 1. FIG. 6A is an exploded perspective view of the intermediate part.

Figure 6B:
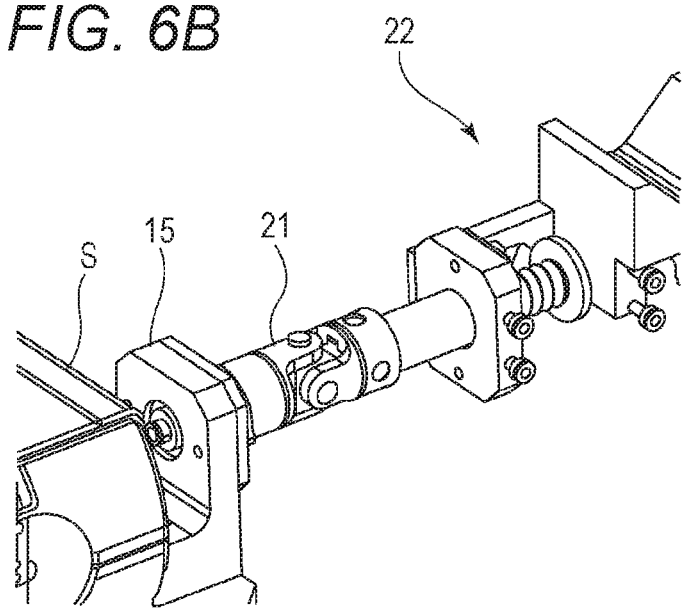
Figure 7A:
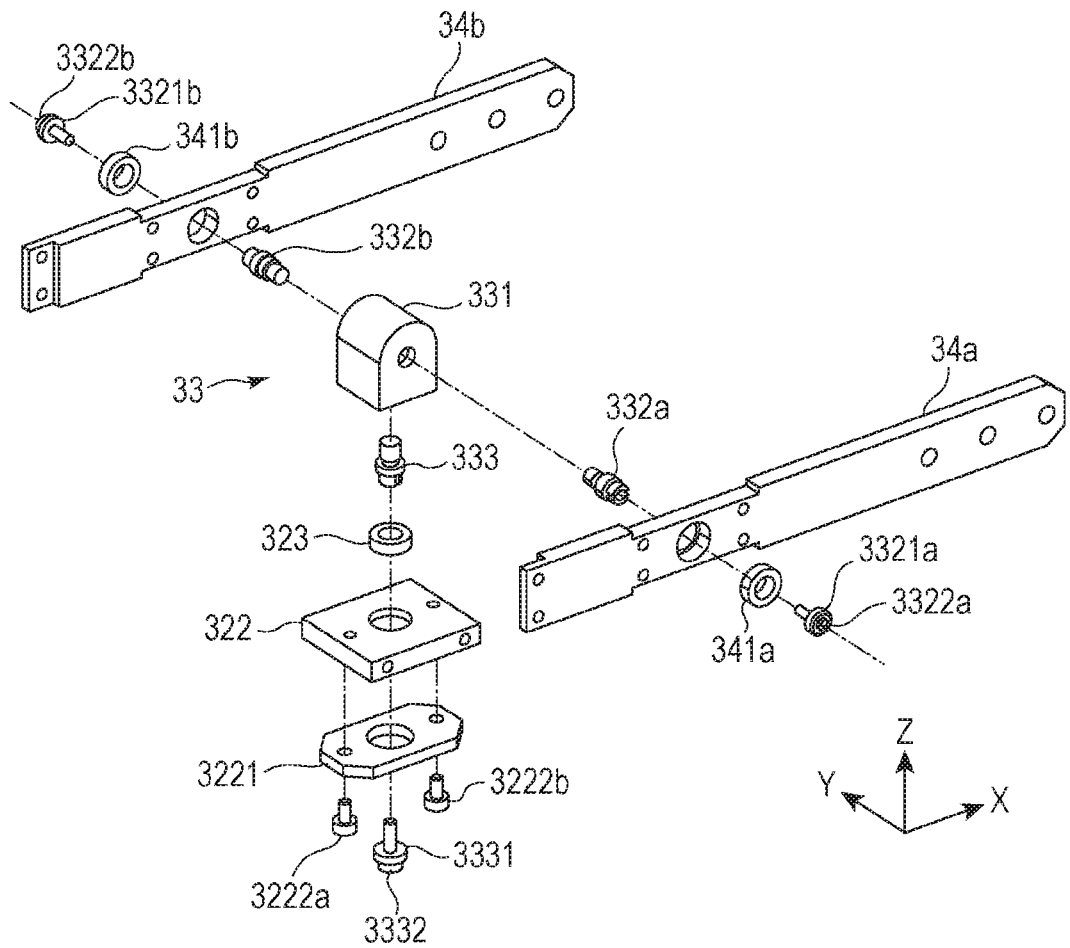
FIG. 7 illustrates the structure of a balancer part in the profiling apparatus in FIG. 1.
Figure 7B:
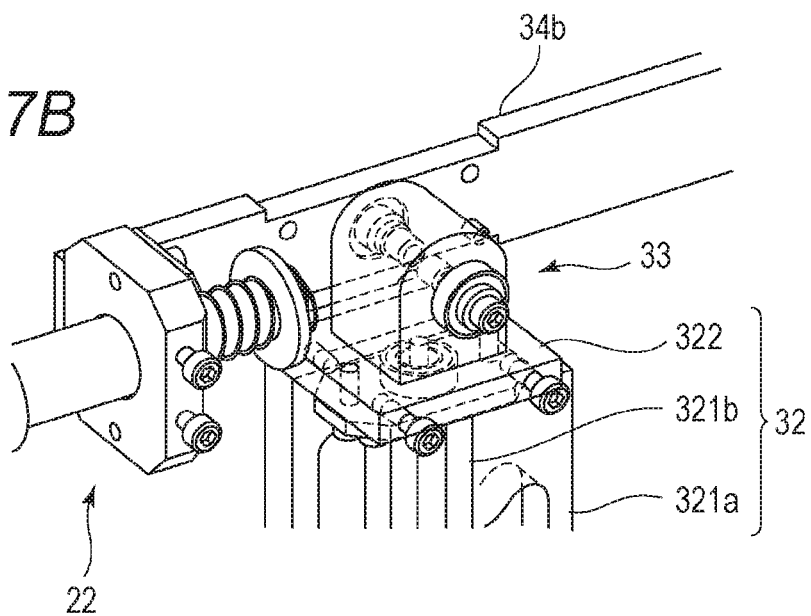
Figure 8:
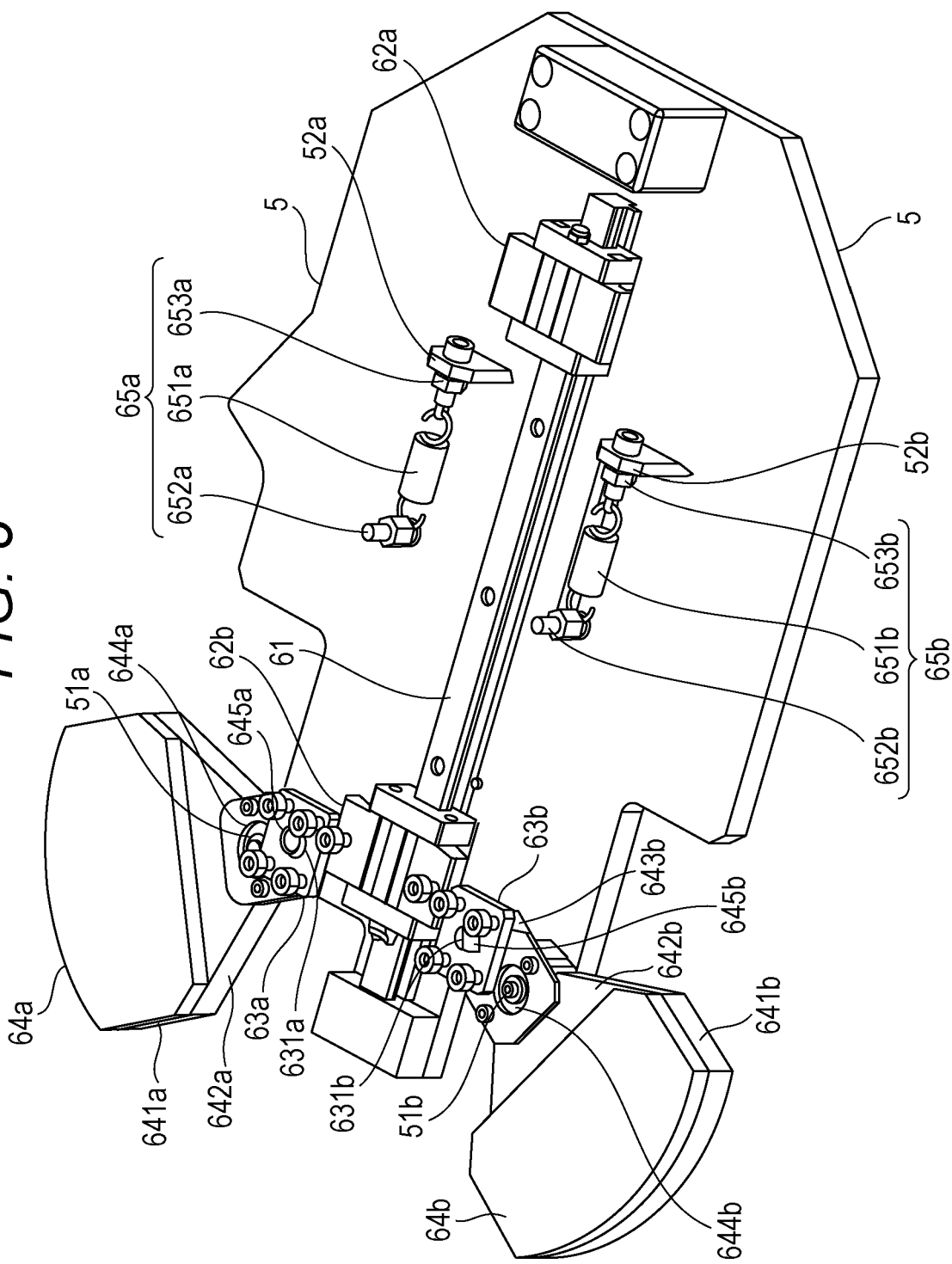
FIG. 8 is a perspective view illustrating the configuration of a part lower than a first base plate in the profiling apparatus in FIG. 1.

FIG. 6B is a perspective view of the intermediate part. FIG. 7 illustrates the structure of a balancer part in the profiling apparatus in FIG. 1. FIG. 7A is an exploded perspective view of the intermediate part. FIG. 7B is a perspective view of the intermediate part. FIG. 8 is a perspective view illustrating the configuration of a part lower than a first base plate in the profiling apparatus in FIG. 1. FIG. 8 illustrates a profiling apparatus D with the first base plate 4 and each member on the first base plate 4 being removed.

For example, as illustrated in FIGS. 1 to 8, a profiling apparatus D in the embodiment causes a subject surface SA of a subject S to follow a target surface of a target (not illustrated), and positions the subject surface SA with respect to the target surface preferably such that the target surface and the subject surface SA are in parallel with each other. The profiling apparatus D includes a holding part 1, an intermediate part 2, and a balancer part 3. In the examples in FIGS. 1 to 8, the profiling apparatus D further includes a first base plate 4, a second base plate 5, and an optional part 6.

The first base plate 4 is a plate-shaped member. The first base plate 4 is spread in parallel with the XY plane when, for example, an XYZ orthogonal coordinate system in FIGS. 1 to 5 is provided. The holding part 1, the intermediate part 2 and the balancer part 3 are mounted on the first base plate 4. The first base plate 4 supports these parts.

The holding part 1 is a member that rotationally moves around a first fulcrum and holds the subject S. In the embodiment, the first fulcrum are two linear and independent axes in two directions for rotational movement around a first axis and rotational movement around a second axis. More specifically, in the examples in FIGS. 1 to 8, the first axis and the second axis of the first fulcrum respectively correspond to the Y-axis and the Z-axis, which are orthogonal to each other. In the embodiment, the holding part 1 includes a first leg part 11 (11*a* and 11*b*), a first annular part 12, a second annular part 13, a mounting part 14, and a coupling part 15. The first leg part 11 stands on the first base plate 4. The first annular part 12 rotationally moves around the first axis (Y-axis) of the first fulcrum with respect to the first leg part 11. The second annular part 13 rotationally moves around the second axis (Z-axis) of the first fulcrum with respect to the first annular part 12. The mounting part 14 is coupled to the first or second annular part 12 or 13, in the examples in FIGS. 1 to 8, the second annular part 13. The mounting part 14 extends in the coupling direction (X-axis direction) orthogonal to each of the first and second axes. The subject S is mounted on the mounting part 14. The coupling part 15 couples the mounting part 14 and the intermediate part 2.

Although the first leg part 11 may support the first annular part 12 in a cantilever manner, the first leg part 11 includes a pair of first and second sub leg parts 11*a* and 11*b* for supporting the first annular part 12 more stably with higher positional accuracy in the embodiment. The first and second sub leg parts 11*a* and 11*b* are spaced apart from each other in a direction (Y-axis direction) in which the first axis extends, and stands on the first base plate 4. The first leg part 11 supports the first annular part 12 from both sides. Each of the first and second sub leg parts 11*a* and 11*b* is a plate-shaped member. The first and second sub leg parts 11*a* and 11*b* stand on an upper surface part on one end side of the first base plate 4, and are fixedly disposed so as to go from one end (end in a −X-axis direction) of the first base plate 4 to the outside, and extend obliquely upward (obliquely in a +Z-axis direction). The first and second sub leg parts 11*a* and 11*b* are spaced apart from each other in a direction along the first axis (Y-axis) of the first fulcrum at an interval in which the first annular part 12 can be disposed. A bearing part such as a through opening and a ball bearing is provided in a part on the upper end side of each of the first and second sub leg parts 11a and 11b. The bearing part bears a first cylindrical shaft member 111a or 111b such that the first shaft member 111a or 111b can move rotationally. The first shaft members 111a and 111b correspond to the first axis (Y-axis) of the first fulcrum. Such configuration of the first leg part 11 (11a and 11b) enables the subject surface SA of the subject S held on the mounting part 14 to protrude outward.

The first annular part 12 is an annular (ring-shaped) member having a first inner size in which the subject S can be disposed via the second annular part 13 therein. The first annular part 12 rotationally moves around the first axis of the first fulcrum with respect to the first leg part 11 (11a and 11b). More specifically, in the embodiment, the first annular part 12 is a short-long tubular member having an octagonal cross section that is long in the direction (Y-axis direction) in which the first axis extends. A pair of first shaft members 111a and 111b is fixedly attached in a standing manner at substantially central positions of both side surfaces of the first annular part 12 so as to extend in the first axis (Y-axis) direction. The first annular part 12 extends along the direction (Z-axis) in which the second axis extends. The pair of first shaft members 111a and 111b is attached to bearing parts provided in the pair of first and second sub leg parts 11a and 11b so as to be born such that the first shaft members 111a and 111b can rotationally move around the first axis. A bearing part such as a through opening and a ball bearing is provided at each of substantially central positions of the upper and lower surfaces of the first annular part 12 that extends along the direction (Y-axis direction) in which the first axis extends. The bearing part bears second cylindrical shaft members 121a and 121b such that the second cylindrical shaft members 121a and 121b can move rotationally. The second cylindrical shaft members 121a and 121b correspond to the second axis (Z-axis) of the first fulcrum.

The second annular part 13 is an annular (ring-shaped) member having a second inner size that is slightly smaller than the first annular part 12 and in which the subject S can be disposed (outer size of the subject S<second inner size of the second annular part 13<first inner size of the first annular part 12). The second annular part 13 rotationally moves around the second axis of the first fulcrum with respect to the first annular part 12. More specifically, in the embodiment, the second annular part 13 is a short-long tubular member having an octagonal cross section that is long in the Y-axis direction similarly to the first annular part 12. A pair of second shaft members 121a and 121b is fixedly attached in a standing manner at substantially central positions of the upper and lower surfaces of the second annular part 13 so as to extend in the second axis (Z-axis) direction. The second annular part 13 extends along the Y-axis direction. The pair of second shaft members 121a and 121b is attached to bearing parts provided in the first annular part 12 so as to be born such that the second shaft members 121a and 121b can rotationally move around the second axis.

The mounting part 14 is a thin plate-shaped member on which the subject S is mounted. In the embodiment, the mounting part 14 is coupled to the second annular part 13, and extends in the coupling direction (X-axis) orthogonal to each of the first and second axes (Y- and Z-axes). More specifically, the subject S is attached on the upper surface of the plate-shaped mounting part 14 such that a part of one end (end in the −X-axis direction) thereof is fixedly attached to the inner lower surface of the second annular part 13 and the subject surface SA of the subject S is in parallel with the plane (YZ plane) formed by the first and second axes.

The coupling part 15 is a member for attaching the intermediate part 2 to the holding part 1. The coupling part 15 is fixedly attached to an upper part of the other end (end in the +X-axis direction) of the mounting part 14. In the embodiment, the coupling part 15 is a member that includes a pair of side walls and has a substantially U shape (C shape) in cross section in the ZX plane. The side walls are spaced apart in the coupling direction (X-axis direction), and stand in the second axis direction (+Z-axis direction). The other side surface (side surface in the +X-axis direction) of the subject S held by the mounting part 14 abuts on one side wall. The subject S is fixedly attached to the one side walls by, for example, a screw. A universal joint 21 described later of the intermediate part 2 is attached to the other side wall.

Although, in the above description, each bearing part is provided in the first and second sub leg parts 11a and 11b, and each of the first shaft members 111a and 111b is attached to the first annular part 12, the first shaft members 111a and 111b may be attached to the first and second sub leg parts 11a and 11b, respectively, and each bearing part may be provided in the first annular part 12. Although, in the above description, each bearing part is provided in the first annular part 12, and each of the second shaft members 121a and 121b is attached to the second annular part 13, the second shaft members 121a and 121b may be attached to the first annular part 12, and each bearing part may be provided in the second annular part 13. Although, in the above description, the second annular part 13 is disposed in the first annular part 12, and the mounting part 14 is attached to the second annular part 13, the first annular part 12 may be disposed in the second annular part 13, and the mounting part 14 may be attached to the first annular part 12.

The subject S is a device that can be used at least in a direction different from the vertical direction, and whose subject surface SA needs to follow a target surface of a target. The subject S is preferably a device that needs to position the subject surface SA with respect to the target surface so that the target surface and the subject surface SA are in parallel with each other. For example, the subject S is an optical characteristic measuring device that measures predetermined optical characteristics. The opening surface of a measurement opening, which faces a measurement surface of a measurement target and which receives measurement light from the measurement surface, corresponds to the subject surface SA. Such optical characteristic measuring devices include, for example, a luminance meter for measuring luminance, a colorimeter for measuring color, and a color luminance meter for measuring color and luminance.

In the embodiment, as illustrated in FIGS. 1 to 8, the subject S is an optical characteristic measuring device including a rectangular parallelepiped box-shaped housing. One end surface (end surface in the −X-axis direction) of the box-shaped housing has a curved surface SF protruding outward. A measurement opening SA having an opening surface serving as the subject surface SA is formed on the top of the curved surface SF. In the example, as illustrated in FIG. 1, four protrusions CP for point contact are provided around the measurement opening SA at equal intervals (every 90 degrees) in the circumferential direction. An optical characteristic measuring device generally needs to measure optical characteristics with a geometry that has been preliminarily defined by, for example, a standard. As described later, the profiling apparatus D in the embodiment enables the subject surface (opening surface of a measurement opening in an optical characteristic measuring device) SA to follow a target surface. This enables measurement of optical characteristics with the geometry and with higher accuracy. The subject S is thus preferably an optical characteristic measuring device. In particular, forming the measurement opening SA serving as the subject surface SA on the top of the curved surface SF enables the opening surface SA of the measurement opening to preferably follow the measurement surface of a measurement target without the interference of another member. For example, the profiling apparatus D in which an optical characteristic measuring device is used as the subject S is attached to a robot arm, and used in a production line of an automobile. The profiling apparatus D follows a curved surface of the automobile at each of predetermined locations (parts) in the automobile. This enables colors of exterior coating to be measured with high accuracy, and enables colors of each of the locations in the automobile to be automatically managed.

The intermediate part 2 is a member that is coupled to the holding part 1 at one end and that has a degree of freedom except the coupling direction. In the embodiment, the intermediate part 2 is a member that is coupled to the holding part 1 at one end, expands and contracts in the coupling direction, and bends in any direction orthogonal to the coupling direction. The intermediate part 2 as described above may be, for example, a cylindrical or tubular elastic rubber body made of rubber. In the embodiment, the intermediate part 2 includes the universal joint 21 and an expansion/contraction part (expansion/contraction mechanism) 22.

A universal joint 21 is a joint that is coupled to the holding part 1 at one end and bends in any direction orthogonal to the coupling direction. More specifically, one end (end in the −X-axis direction) of the universal joint 21 is fixedly attached to the coupling part 15 of the holding part 1.

The expansion/contraction part (expansion/contraction mechanism) 22 is a member that is coupled to the other end (end in the +X-axis direction) of the universal joint 21 and that expands and contracts in the coupling direction. More specifically, in the embodiment, as illustrated in, for example, FIG. 6, the expansion/contraction part 22 includes a first movement part 221, an attachment part 222, a second movement part 223, a return part 224, and a pressing part 225.

The first movement part 221 is a tubular member that extends in the coupling direction. The second movement part 223 is movably accommodated inside the first movement part 221 so as to extend in the coupling direction. One end (end in the −X-axis direction) of the first movement part 221 is engaged with the other end of the universal joint 21 in an attachable/detachable manner.

The attachment part 222 is a member for attaching the first movement part 221 to a later-described arm part 34 (34a and 34b) in the balancer part 3 with the second movement part 223 being movably accommodated in the attachment part 222. In the arm part 34, the balancer part 3 may be supported in a cantilever manner. In the embodiment, in order to support the balancer part 3 on both sides, the arm part 34 includes a pair of first and second sub arm parts 34a and 34b. The first and second sub arm parts 34a and 34b are spaced apart from each other at predetermined intervals in a direction along a later-described first axis (Y-axis) of a second fulcrum as illustrated in, for example, FIG. 7. More specifically, the attachment part 222 is a plate-shaped member having a width in accordance with the predetermined interval in the pair of first and second sub arm parts 34a and 34b.

The attachment part 222 is fixedly attached so as to be sandwiched by the pair of first and second sub arm parts 34a and 34b at ends (ends in the −X-axis direction) of the pair of first and second sub arm parts 34a and 34b. A through opening is formed in the plate-shaped attachment part 222. The through opening has a shape corresponding to the outer shape at the other end (end in the +X-axis direction) of the first movement part 221. The other end of the first movement part 221 is fixedly attached to the attachment part 222 by being fitted into and fixed in the through opening.

The second movement part 223 is a cylindrical or tubular member that extends in the coupling direction. The second movement part 223 is movably accommodated inside the first tubular movement part 221 along the coupling direction. The size of the outer shape of the second movement part 223 is smaller than that of the inner shape of the first movement part 221. For example, when the first movement part 221 is tubular, and the second movement part is cylindrical, the diameter of the second movement part 223 is smaller than the inner diameter of the first movement part 221. The length of the second movement part 223 along the coupling direction is larger than that of the first movement part 221. One end (end in the −X-axis direction) of the second movement part 223 is fixedly attached to the other end of the universal joint 21. The other end (end in the +X-axis direction) of the second movement part 223 is fixedly attached to the pressing part 225, which is a disc-shaped member, by, for example, a screw 2251.

The return part 224 is a member that returns the intermediate part 2 from a bending posture to an original posture. The return part 224 is, for example, a compression coil spring (return spring) 224. A part of the second movement part 223 on the other end side is inserted into the return part 224. The return part 224 is disposed between the attachment part 222 and the pressing part 225. That is, the return spring 224 is pressed by the attachment part 222 and the pressing part 225. The size of the inner shape of the return spring 224, which is a coil spring, is larger than the size of the outer shape of the second movement part 223 on the other end side. The size of the outer shape is smaller than the size of each of the attachment part 222 and the pressing part 225 (i.e., size of each of the attachment part 222 and the pressing part 225 is larger than the size of the outer shape of the return spring 224). The spring constant of the return spring 224 is appropriately set in accordance with the specifications by considering, for example, pressing force with which the subject surface SA is pressed on a target surface and return force necessary for return.

As described later, when the subject S comes into contact with a target, external force is generated to bend the universal joint 21. The second movement part 223 relatively moves along the coupling direction with respect to the first movement part 221 in accordance with the bending of the universal joint 21. The movement expands the expansion/contraction part (expansion/contraction mechanism) 22 having such configuration. At this time, the distance between the attachment part 222 and the pressing part 225 becomes narrower than that before the movement, and the return spring 224 is compressed. In contrast, when the external force is released, the compressed return spring 224 exerts an urging force to widen the gap between the attachment part 222 and the pressing part 225. This relatively moves the second movement part 223 and the first movement part 221 along the coupling direction. The expansion/contraction part 22 is returned to the original state. When the intermediate part 2 expands and contracts, the return spring 224 returns the intermediate part 2 to the original length before the expansion and contraction.

The balancer part 3 is a member that is coupled to the other end of the intermediate part 2 and that rotationally moves around the second fulcrum different from the first fulcrum of the holding part 1. In the embodiment, the second fulcrum are two linear and independent axes in two directions for rotational movement around a first axis and rotational movement around a second axis in accordance with the first fulcrum having two axes. More specifically, in the example in FIGS. 1 to 8, the first and second axes in the second fulcrum correspond to the Y- and Z-axes orthogonal to each other, respectively, similarly to the first and second axes in the first fulcrum. In the embodiment, the balancer part 3 includes a second leg part 32, a rotationally moving part 33, the arm part 34 (34a and 34b), and a weight 31. The second leg part 32 stands on the first base plate 4. The rotationally moving part 33 rotationally moves around the second axis (Z-axis) of the second fulcrum with respect to the second leg part 32. The arm part 34 (34a and 34b) rotationally moves around the first axis (Y-axis) of the second fulcrum with respect to the rotationally moving part 33, and extends along the coupling direction. The weight 31 is coupled to the arm part 34.

The second leg part 32 is a rectangular parallelepiped member having a predetermined height. The second leg part 32 is fixedly disposed so as to stand on the upper surface part of the first base plate 4 on the other end side. Although, in the standby state in which the subject surface SA of the subject S does not abut on a target surface, the holding part 1, the intermediate part 2, and the balancer part 3 do not necessarily need to be in the horizontal posture, the predetermined height is set, in the embodiment, such that these components are in the horizontal posture in the standby state. The rotationally moving part 33 is attached on the upper surface of the second leg part 32 so as to rotationally move around the second axis (Z-axis) of the second fulcrum. More specifically, the second leg part 32 includes a bottom plate part, a pair of first and second side wall parts 321a and 321b, a top plate part 322, and a bearing part 323. The first base plate 4 serves as the bottom plate part. Each of the first and second side wall parts 321a and 321b is a plate-shaped member. The first and second side wall parts 321a and 321b stand on an upper surface part on the other end side of the first base plate 4, and are fixedly disposed so as to extend upward (in the +Z-axis direction). The first and second side wall parts 321a and 321b are spaced apart from each other in a direction along the first axis (Y-axis) of the second fulcrum at a predetermined interval. The top plate part 322 is a plate-shaped member. The top plate part 322 is fixedly attached so as to be sandwiched between the pair of first and second side wall parts 321a and 321b at an upper end (end in the +Z-axis direction) of the pair of first and second side wall parts 321a and 321b. As illustrated in FIG. 7, the bearing part 323 such as a through opening and a ball bearing is provided at substantially a central position of the top plate part 322. The bearing part 323 bears a cylindrical second shaft member 333 such that the second shaft member 333 can move rotationally. The second shaft member 333 corresponds to the second axis (Z-axis) of the second fulcrum.

The rotationally moving part 33 is a member that rotationally moves around the second axis (Z-axis) of the second fulcrum with respect to the second leg part 32, and that supports the arm part 34 such that the arm part 34 can rotationally move around the first axis (Y-axis) of the second fulcrum. More specifically, as illustrated in, for example, FIG. 7, the rotationally moving part 33 is, for example, a rectangular parallelepiped member having a curved upper surface. The cylindrical second shaft member 333 is fixedly attached in a standing manner at a substantially central position of the bottom surface of the rotationally moving part 33 so as to extend in the second axis (Z-axis) direction. The second shaft member 333 is attached to the bearing part 323 provided in the top plate part 322 of the second leg part 32 so as to be born such that the second shaft member 333 can rotationally move around the second axis. In order to prevent the second shaft member 333 from being detached from the bearing part 323, a washer 3331 is screwed with a screw 3332 at an end of the second shaft member 333 via a plate-shaped spacer part 3221. The spacer part 3221 is attached to the top plate part 322 with the bearing part 323 and screws 3222a and 3222b. A pair of cylindrical first shaft members 332a and 332b is fixedly attached in a standing manner to substantially central positions of both side surfaces of the rotationally moving part 33 so as to extend in the first axis (Y-axis) direction.

The arm part 34 is a member that rotationally moves around the first axis (Y-axis) of the second fulcrum with respect to the rotationally moving part 33, and that extends along the coupling direction. In the embodiment, as described above, the arm part 34 includes the pair of first and second sub arm parts 34a and 34b. Each of the pair of first and second sub arm parts 34a and 34b is a plate-shaped member that is long in the coupling direction. Bearing parts 341a and 341b such as a through opening and a ball bearing are provided at predetermined positions in the coupling direction of the pair of first and second sub arm parts 34a and 34b, respectively. The bearing parts 341a and 341b bear the pair of first shaft members 332a and 332b of the rotationally moving part 33 such that the pair of first shaft members 332a and 332b can move rotationally. The predetermined position corresponds to the first axis position of the second fulcrum, and is appropriately set in consideration of, for example, the length of the expansion/contraction part 22 along the coupling direction. In the examples in FIGS. 1 to 8, the predetermined position is set to be closer to one end (end in the −X-axis direction) side than the central position of the pair of first and second sub arm parts 34a and 34b in the coupling direction. The pair of first shaft members 332a and 332b of the rotationally moving part 33 is respectively attached to the bearing parts 341a and 341b so as to be born such that the pair of first shaft members 332a and 332b can rotationally move around the first axis. In order to prevent a first shaft member 332a from being detached from a bearing part 341a, a washer 3321a is screwed to an end of the first shaft member 332a with a screw 3322a via the bearing part 341a. Similarly, in order to prevent a first shaft member 332b from being detached from a bearing part 341b, a washer 3321b is screwed to an end of the first shaft member 332b with a screw 3322b via the bearing part 341b. This causes the arm part 34 (34a and 34b) to be attached to the rotationally moving part 33 such that the arm part 34 rotationally can move around the first axis with respect to the rotationally moving part 33.

The weight 31 is a member that is coupled to the arm part 34, and that gives moment around the second fulcrum. The weight of the weight 31 is set as described later. The weight 31 has a relatively flat rectangular parallelepiped shape. The weight 31 is fixedly attached so as to be sandwiched between the pair of first and second sub arm parts 34a and 34b at the other end (end in the +X-axis direction) of the pair of first and second sub arm parts 34a and 34b. In FIG. 7, the illustration of the weight 31 is omitted.

Although, in the above description, the bearing part 323 is provided in the second leg part 32, and the second shaft member 333 is attached to the rotationally moving part 33, the second shaft member 333 may be attached to the second leg part 32, and the bearing part 323 may be provided in the second leg part 32. Although, in the above description, the bearing parts 341a and 341b are provided in the pair of first and second sub arm parts 34a and 34b, respectively, and the pair of first shaft members 332a and 332b is attached to the rotationally moving part 33, the first shaft members 332a and 332b may be attached to the pair of first and second sub arm parts 34a and 34b, and each of the bearing parts 341a and 341b may be provided in the rotationally moving part 33.

Similarly to the first base plate 4, the second base plate 5 is a plate-shaped member having a plane spread in parallel with the XY plane. The second base plate 5 is attached to the first base plate 4 via the optional part 6 so as to be in parallel with the first base plate 4.

The optional part 6 is a mechanism that adds a predetermined function to the holding part 1, the intermediate part 2, and the balancer part 3 supported by the first base plate 4. The holding part 1, the intermediate part 2, and the balancer part 3 cause the subject surface SA of the subject S to follow a target surface of a target. In the embodiment, the optional part 6 includes a movement mechanism and a balancer mechanism. The movement mechanism moves the holding part 1 in an attachment/detachment direction in which the target surface of the target and the subject surface SA of the subject S are attached or detached to/from each other. In order to make the profiling apparatus D preferably usable in a direction other than the horizontal direction, particularly in the vertical direction, when the profiling apparatus D is used in the direction other than the horizontal direction, the balancer mechanism balances the first base plate 4 and each member supported on the first base plate 4. For example, in order to implement each of these functions, as illustrated in, for example, FIG. 8, the optional part 6 includes a guide rail 61, a sliding part 62 (62a and 62b), an engaging part 63 (63a and 63b), a second weight part 64 (64a and 64b), and an urging part 65 (65a and 65b).

The guide rail 61 is a protruding member for guiding the sliding part 62. The guide rail 61 extends in the attachment/detachment direction, and is disposed on the second base plate 5. In the embodiment, for example, the attachment/detachment direction corresponds to the coupling direction (X-axis direction). The guide rail 61 is a long rectangular cylindrical member. The guide rail 61 is attached on substantially the center of the second base plate 5 with the long direction being along the attachment/detachment direction (coupling direction or X-axis direction).

The sliding part 62 is a member that is slidably attached to the guide rail 61, and that is attached to the first base plate 4. In the embodiment, the sliding part 62 includes two first and second sub sliding parts 62a and 62b in order to support the first base plate 4 at two locations. Each of the first and second sub sliding parts 62a and 62b is a rectangular parallelepiped member. The first and second sub sliding parts 62a and 62b have a groove on the bottom surface so as to be slidably attached to the guide rail 61. The groove has a shape corresponding to the outer shape of the protruding guide rail 61, and extends in the attachment/detachment direction. The first sub sliding part 62a is attached to a part of one end (end in the −X-axis direction) of the guide rail 61 so as to slide in the groove. The back surface of the first base plate 4 abuts on the upper surface of the first sub sliding part 62a, and the first base plate 4 is fixedly attached to the upper surface of the first sub sliding part 62a. The second sub sliding part 62b is attached to a part of the other end (end in the +X-axis direction) of the guide rail 61 so as to slide in the groove. The back surface of the first base plate 4 abuts on the upper surface of the second sub sliding part 62b, and the first base plate 4 is fixedly attached to the upper surface of the second sub sliding part 62b.

The guide rail 61 and the sliding part 62 are examples of the movement mechanism. In the movement mechanism including the guide rail 61 and the sliding part 62 as described above, the sliding part 62 attached to the first base plate 4 is guided by the guide rail 61 extending in the attachment/detachment direction, so that the holding part 1 can move in the attachment/detachment direction.

The second weight part 64 is a member that balances the first base plate 4 and each member supported on the first base plate 4 when the profiling apparatus D is used in a direction other than the horizontal direction. When force acts on the first base plate 4 in a direction in which the subject surface SA of the subject S approaches a target surface of a target by the self-weight of the first base plate 4 and each member supported on the first base plate 4, the second weight part 64 generates force (counter force) opposing the force, and causes the generated force to act on the first base plate 4. In the embodiment, the second weight part 64 includes a pair of first and second sub weight parts 64a and 64b having the same structure in order to generate the counter force from both sides of the guide rail 61. The pair of first and second sub weight parts 64a and 64b includes sub weight body parts 641a and 641b, first extending parts 642a and 642b, second extending parts 643a and 643b, bearing parts 644a and 644b, and engaging protrusions (engaging pins) 645a and 645b. The sub weight body parts 641a and 641b have a predetermined weight and a flat and substantially rectangular parallelepiped shape. The first extending parts 642a and 642b extend from one side surface of the sub weight body parts 641a and 641b, and have a substantially trapezoidal plate shape. The second extending parts 643a and 643b further extend from one side surface of the first extending parts 642a and 642b, and have a rectangular plate shape. The bearing parts 644a and 644b include, for example, a through opening and a ball bearing, and are provided in the second extending parts 643a and 643b. The engaging protrusions (engaging pins) 645a and 645b are provided in the second extending parts 643a and 643b so as to stand in a direction (in the embodiment, the second axis direction of the first and second fulcrums, or Z-axis direction) orthogonal to the attachment/detachment direction.

A pair of cylindrical first and second support shafts 51a and 51b is provided on both upper surface sides of a part of the other end (end in the +X-axis direction) of the second base plate 5 so as to stand in a direction orthogonal to the attachment/detachment direction (in the embodiment, the second axis direction of the first and second fulcrums, or Z-axis direction). The first sub weight part 64a is attached to the second base plate 5 by the bearing part 644a provided in the first extending part 642a of the first sub weight part 64a being attached to the first support shaft 51a so as to rotationally move around the axis of the first support shaft 51a. Similarly, the second sub weight part 64b is attached to the second base plate 5 by the bearing part 644b provided in the first extending part 642b of the second sub weight part 64b being attached to the second support shaft 51b so as to rotationally move around the axis of the second support shaft 51b.

The engaging part 63 is a member for engaging the second weight part 64 with the first base plate 4. In the embodiment, the second weight part 64 includes the pair of first and second sub weight parts 64a and 64b. Accordingly, a pair of first and second sub engaging part 63a and 63b is provided. Each of the pair of first and second sub engaging parts 63a and 63b is a plate-shaped member. Oval openings 631a and 631b that are long in a direction (Y-axis direction) orthogonal to the attachment/detachment direction are provided at a substantially central position of the pair of first and second sub engaging parts 63a and 63b. The openings 631a and 631b may be recesses (recessed grooves). The first sub engaging part 63a is attached to the first sub weight part 64a by inserting the end part of the engaging protrusion 645a of the first sub weight part 64a into the opening 631a of the first sub engaging part 63a. The upper surface of the first sub engaging part 63a abuts on the back surface of the first base plate 4. The first sub engaging part 63a is then attached to the first base plate 4. Similarly, the second sub engaging part 63b is attached to the second sub weight part 64b by inserting the end part of the engaging protrusion 645b of the second sub weight part 64b into the opening 631b of the second sub engaging part 63b. The upper surface of the second sub engaging part 63b abuts on the back surface of the first base plate 4. The second sub engaging part 63b is then attached to the first base plate 4.

The urging part 65 is a member for applying predetermined urging force to the first base plate 4. When the profiling apparatus D is positioned in a direction other than the horizontal direction, and then the profiling apparatus D is again positioned in the horizontal direction, the urging part 65 returns the second weight part 64 (64a and 64b) to the initial position in the case where the profiling apparatus D is positioned in the horizontal direction. In the embodiment, similarly to the second weight part 64, the urging part 65 includes a pair of first and second sub urging parts 65a and 65b having the same structure in order to generate the urging force from both sides of the guide rail 61. The pair of first and second sub urging parts 65a and 65b includes first tension springs 651a and 651b, first attachment members 652a and 652b, and second attachment members 653a and 653b. One end of the first tension spring 651a is attached to the first attachment member 652a. The other end of the first tension spring 651a is attached to the second attachment member 653a. The second attachment member 653a is attached to an attachment part 52a, such as a protruding piece that protrudes from the second base plate 5, provided on one end side of the second base plate 5 in the attachment/detachment direction (coupling direction, or X-axis direction). This configuration couples the first tension spring 651a to the second base plate 5. The first attachment member 652a is attached to an attachment part, such as an opening, provided at a predetermined position (e.g., substantially a central position) of the first base plate 4 in the coupling direction (attachment/detachment direction, or X-axis direction). This configuration couples the first tension spring 651a to the first base plate 4. Similarly, one end of the second tension spring 651b is attached to the first attachment member 652b. The other end is attached to the second attachment member 653b. The second attachment member 653b is attached to an attachment part 52b, such as a protruding piece that protrudes from the second base plate 5, provided on one end side of the second base plate 5 in the attachment/detachment direction (coupling direction, or X-axis direction). This configuration couples the second tension spring 651b to the second base plate 5. The first attachment member 652b is attached to an attachment part, such as an opening, provided at a predetermined position (e.g., substantially a central position) of the first base plate 4 in the coupling direction (attachment/detachment direction, or X-axis direction). This configuration couples the second tension spring 651b to the first base plate 4. Each of the spring constants of the first and second tension springs 651a and 651b is appropriately specified in accordance with the specifications by considering, for example, the weights of, for example, the first base plate 4, each member on the first base plate 4, and the second weight part 64.

The engaging part 63, the second weight part 64, and the urging part 65 are examples of the balancer mechanism. When the profiling apparatus D is used in a direction other than the horizontal direction, particularly in the vertical direction, force acts on the first base plate 4 in a direction in which the subject surface SA of the subject S approaches a target surface of a target by the self-weight of the first base plate 4 and each member supported on the first base plate 4. Here, in the balancer mechanism including the above-mentioned engaging part 63, the second weight part 64, and the urging part 65, force that rotationally moves around the support shaft acts on the second weight part 64 by the self-weight of the second weight part 64. The force in the rotational movement direction is converted into force (counter force) in a direction in which the subject surface SA of the subject S is spaced apart from the target surface of the target by the engaging protrusion of the engaging part 63 being guided into an oval opening provided in the engaging part 63. That is, the oval opening provided in the engaging part 63 functions as a so-called cam groove. The engaging protrusion provided in the second weight part 64 functions as a so-called cam floor. This enables the first base plate 4 and each member supported on the first base plate 4 and the second weight part 64 to be balanced, enables a load generated by gravity in accordance with a posture to be constant, and enables the profiling apparatus D to be used in a direction other than the horizontal direction, particularly in the vertical direction. That is, the profiling apparatus D can be used in any posture. At this time, if the second weight part 64 rotationally moves around the support shaft by its own weight, the tension spring 651 expands to generate urging force. When the profiling apparatus D is moved from the other direction to the horizontal direction, the second weight part 64 is returned to the initial position of the second weight part 64 by the urging force.

Figure 9:
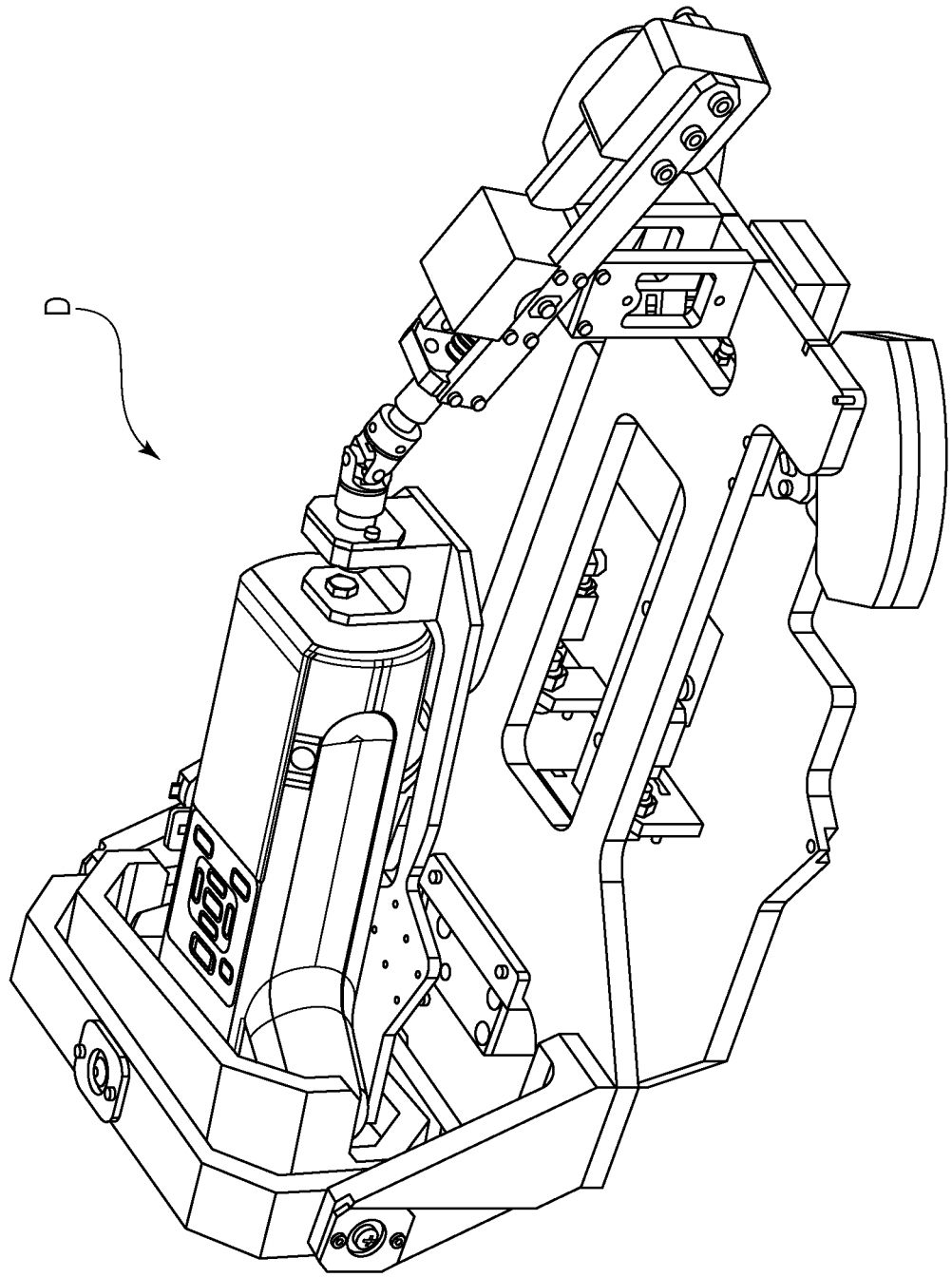
FIG. 9 is a perspective view of the profiling apparatus with a subject surface being made to follow a target surface of a target (not illustrated).
Figure 10:
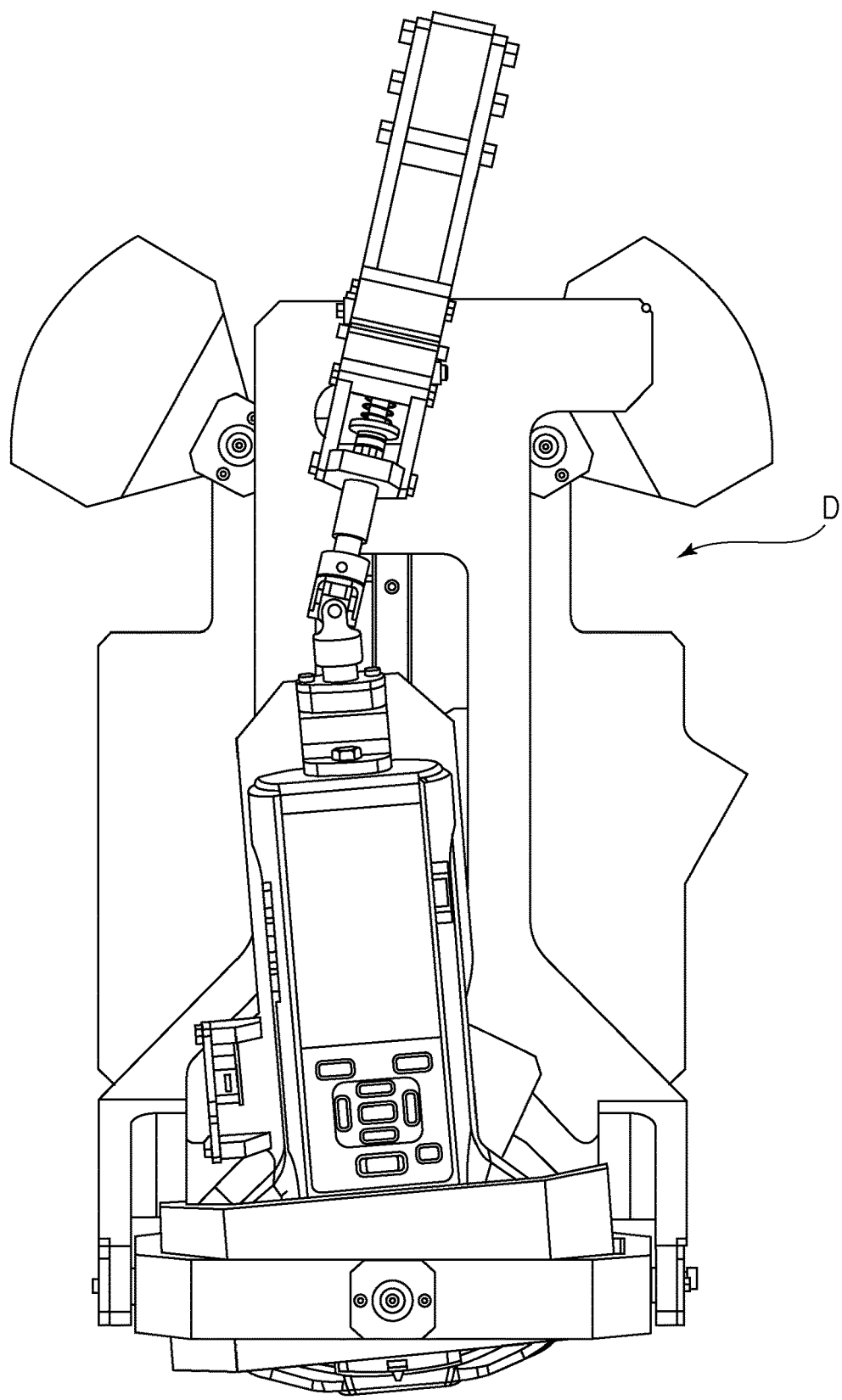
FIG. 10 is a top view of the profiling apparatus in FIG. 9.
Figure 11:
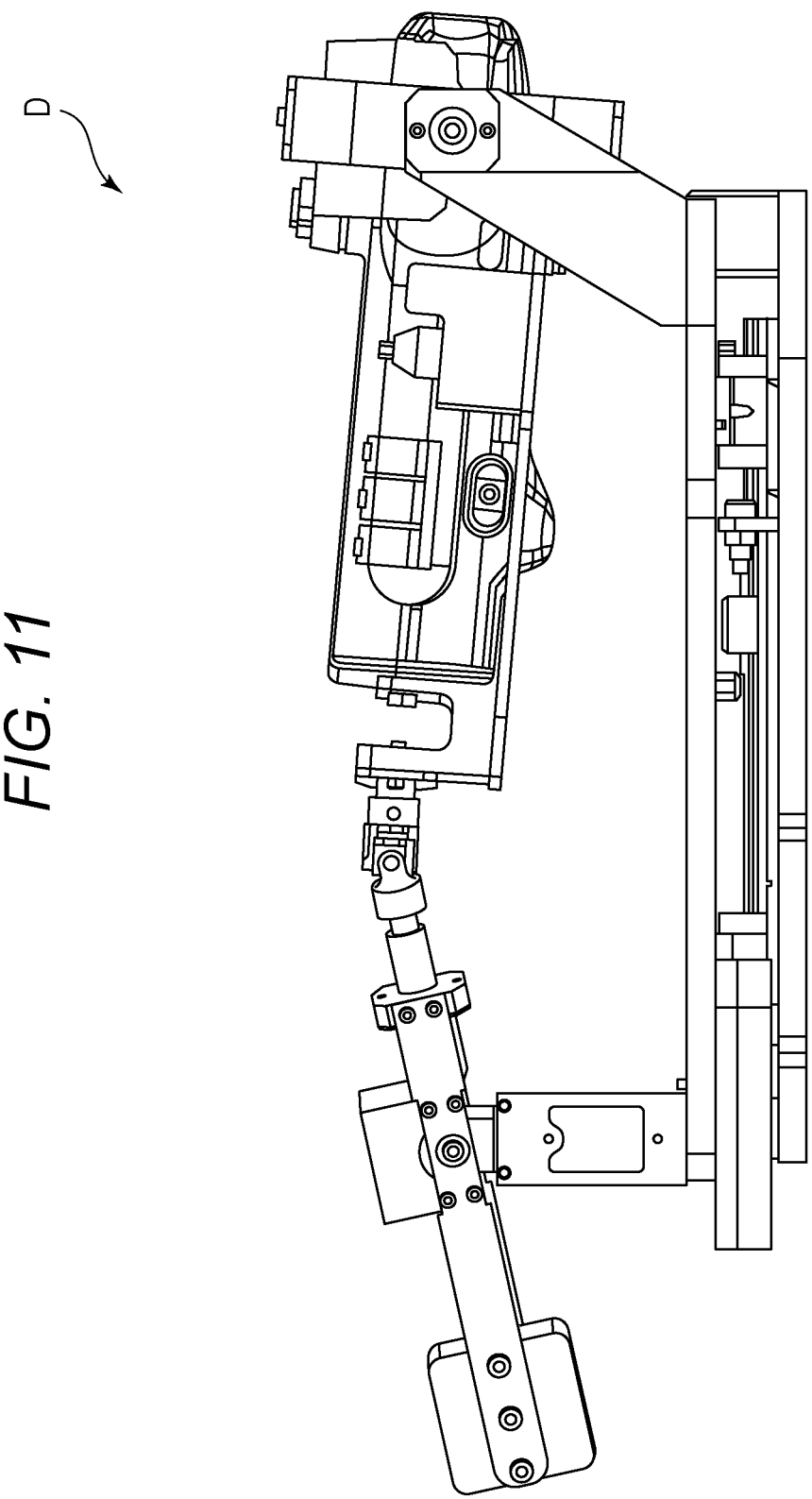
FIG. 11 is a side view of the profiling apparatus in FIG. 9.
Figure 12:
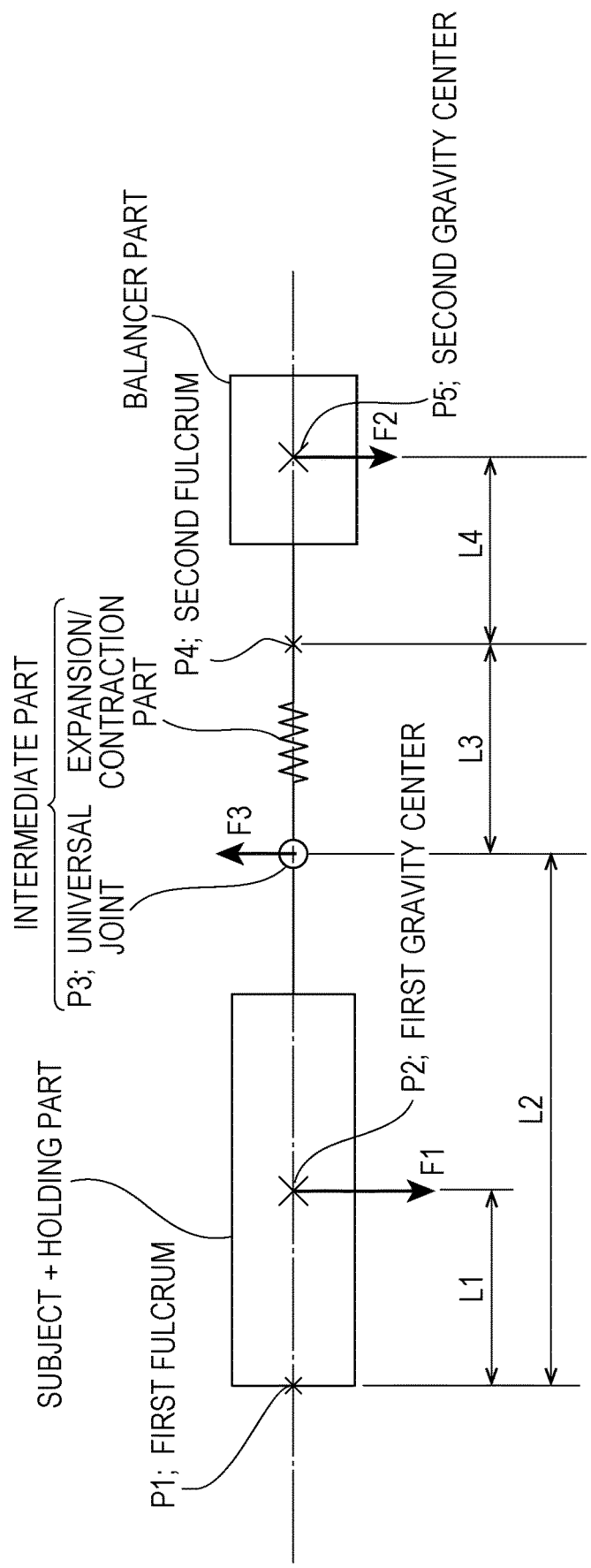
FIG. 12 illustrates the operation of the profiling apparatus in FIG. 1.
Figure 13:
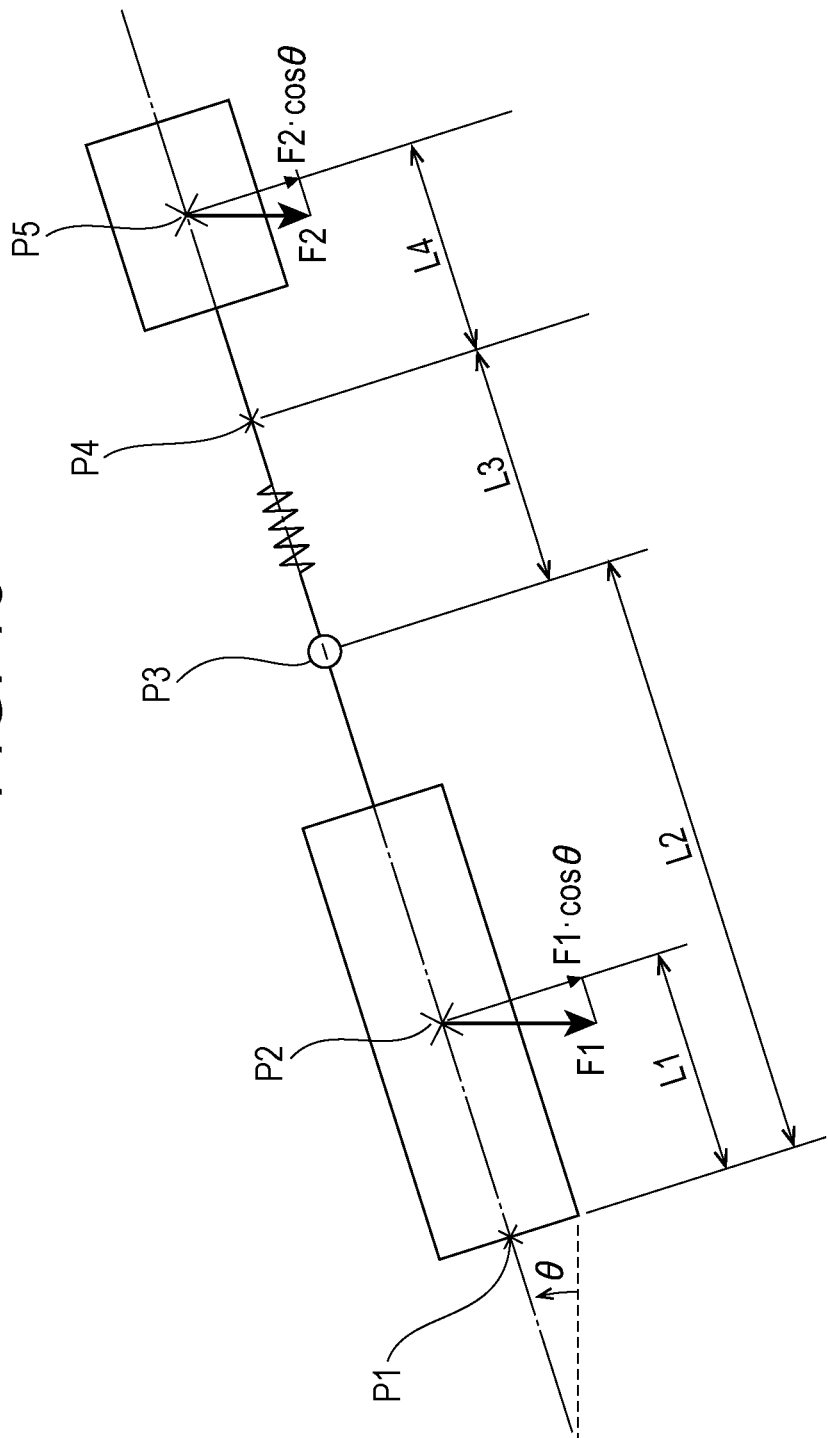
FIG. 13 illustrates the operation of the profiling apparatus in FIG. 1 in the case where the entire profiling apparatus is inclined at an angle of θ.
Figure 14:
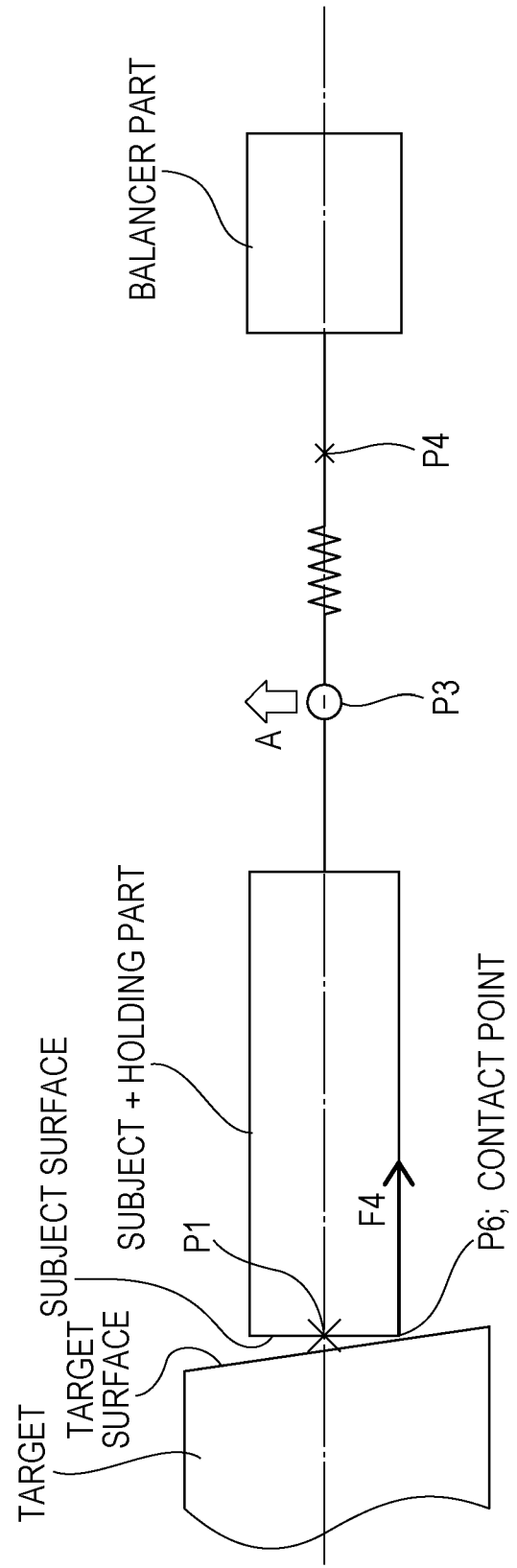
FIG. 14 illustrates the operation of the profiling apparatus in FIG. 1 in the case where a subject surface of a subject is made to follow the target surface of the target.
Figure 15:
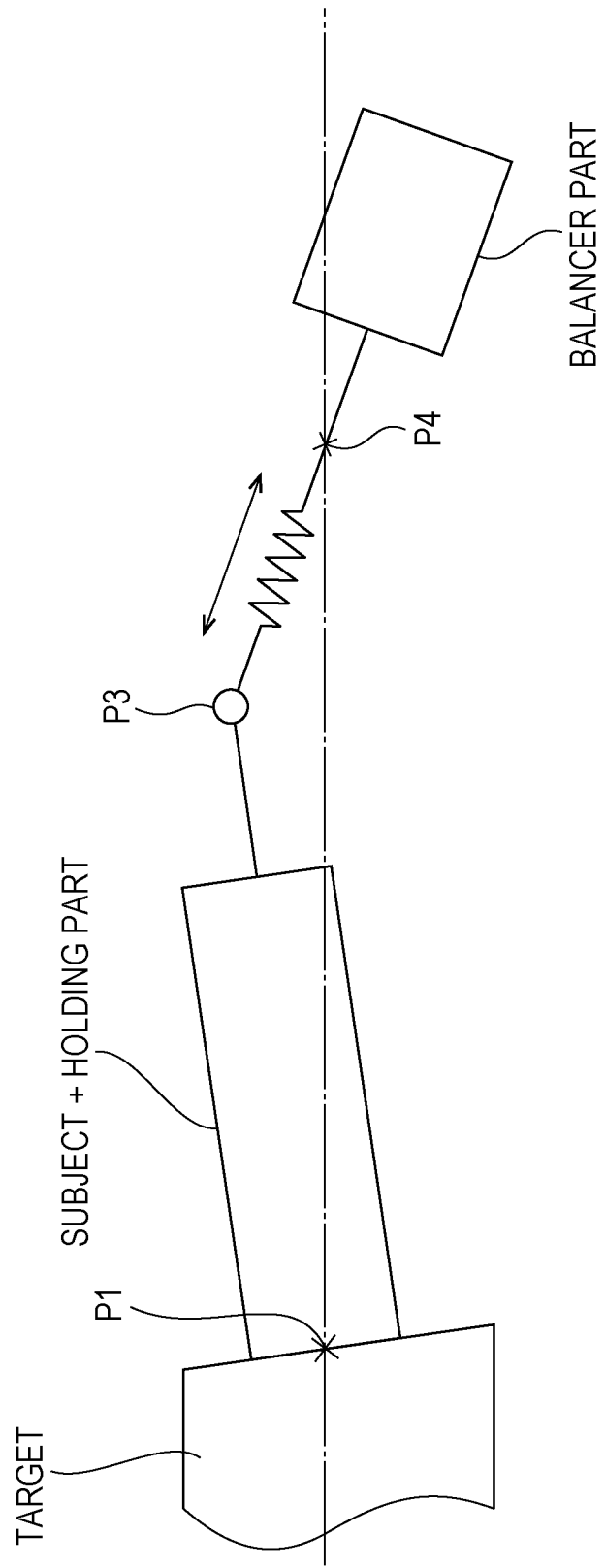
FIG. 15 illustrates force that acts on an expansion/contraction part in the case of FIG. 14.
Figure 16:
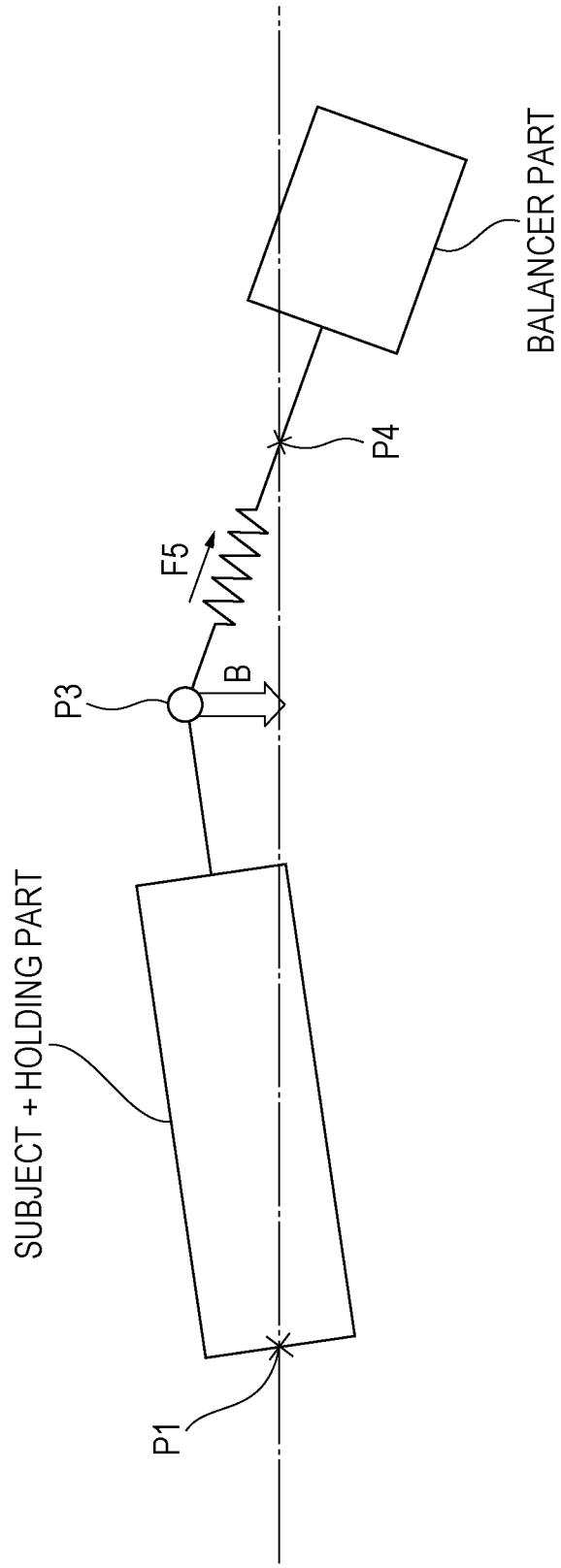
FIG. 16 illustrates the operation in the case where the subject surface of the subject is detached from the target surface of the target.

The operation of the embodiment will now be described. FIG. 9 is a perspective view of the profiling apparatus with a subject surface following a target surface of a target (not illustrated). FIG. 10 is a top view of the profiling apparatus in FIG. 9. FIG. 11 is a side view of the profiling apparatus in FIG. 9. FIG. 12 illustrates the operation of the profiling apparatus in FIG. 1. FIG. 13 illustrates the operation of the profiling apparatus in FIG. 1 in the case where the entire profiling apparatus is inclined at an angle of θ. FIG. 14 illustrates the operation of the profiling apparatus in FIG. 1 in the case where a subject surface of a subject follows the target surface of the target. FIG. 15 illustrates force that acts on an expansion/contraction part in the case of FIG. 14. FIG. 16 illustrates the operation in the case where the subject surface of the subject is detached from the target surface of the target.

In the profiling apparatus D having such a configuration, a first fulcrum position and a first gravity center position are aligned in this order, so that the first fulcrum position and the first gravity center position do not coincide with each other. That is, the position of the first axis of the first fulcrum and the first gravity center position do not coincide with each other. The position of the second axis of the first fulcrum and the first gravity center position do not coincide with each other. In particular, depending on the intended use of the subject S, such as an optical characteristic measuring device, the subject S needs to be supported at a position near the subject surface SA so that the subject surface SA is stably positioned with respect to a target surface. In such a case, the first fulcrum position and the first gravity center position do not coincide with each other. The first gravity center position is a position of a gravity center of a part, which rotationally moves around the first fulcrum, in the subject S and the holding part 1 in the case where the subject S is held. In the examples in FIGS. 1 to 8, the first gravity center position is the position of a gravity center of the holding part 1 except the first leg part 11 (11*a* and 11*b*) and the subject S. As a result of the non-coincidence, when the profiling apparatus D is used in a direction in which the first fulcrum position and the first gravity center position are not aligned on a vertical line, for example, in the horizontal direction, the subject S and the holding part 1 (except the first leg part 11 in the above-described example) rotationally move around the first fulcrum by their own weights. Here, in the above-described profiling apparatus D, the first fulcrum position, the first gravity center position, the bending position, the second fulcrum position, and the second gravity center position are aligned in this order. The balancer part 3 that rotationally moves around the second fulcrum is coupled to the holding part 1 via the intermediate part 2. For this reason, even if the subject S and the holding part 1 rotationally move around the first fulcrum by their own weights, the rotational movement can be stopped at a position where the subject surface SA follows the target surface. For example, as illustrated in FIGS. 9 to 11, when the subject surface SA of the subject S is made to follow the target surface of the target (not illustrated), the universal joint 21 of the intermediate part 2 bends to balance the subject S and the holding part 1 and the balancer part 3, and thus the rotational movement is stopped at the position where the subject surface SA follows the target surface. The above-described profiling apparatus D can thus be used not only in the vertical direction but in other directions, particularly in the horizontal direction.

Operations of the above-described profiling apparatus D will be mechanically and more specifically described below in one example. For simplifying the description, a case will be described. In the case, the first fulcrum position, the first gravity center position, the bending position, the second fulcrum position, and the second gravity center position are positioned on the same straight line in the standby state where the subject surface of the subject S does not abut on a target surface of a target. Things related to the first axis (Y-axis) of the first and second fulcrums and things related to the second axis (Z-axis) of the first and second fulcrums can be similarly described. These things will thus not be distinguished, and described as things related to the first and second fulcrums.

First, the weight of the balancer part will be considered. In FIG. 12, when a load acting on a first gravity center position P2 of a part, which rotationally moves around the first fulcrum, of the subject and the holding part in the case where the subject is held is defined as F1, a load acting on a second gravity center position P5 of a part, which rotationally moves around the second fulcrum, of the balancer part is defined as F2, a load acting on a bending position P3 of the intermediate part is defined as F3, a first distance from a first fulcrum position P1 to the first gravity center position P2 is defined as L1, a second distance from the first gravity center position P2 to the bending position P3 is defined as L2, a third distance from the bending position P3 to a second fulcrum position P4 is defined as L3, and a fourth distance from the second fulcrum position P4 to the second gravity center position P5 is defined as L4, the following expression form-1 is established at the first gravity center position P2, and the system is balanced in the following expression form-2. The load F2 is thus be represented by the following expression form-3.

$$L3 \cdot F3 = L4 \cdot F2 \quad \text{Expression form-1;}$$

$$L1 \cdot F1 = L2 \cdot F3 \quad \text{Expression form-2;}$$

$$F2 = \{(L1 \cdot L3)/(L2 \cdot L4)\} \cdot F1 \quad \text{Expression form-3;}$$

In order to set a positional relation in which the positions P1, P2, P3, P4, and P5 are balanced, when mass of a part, which rotationally moves around the first fulcrum, of the subject and the holding part in the case where the subject is held is defined as m1, mass m2 of a part, which rotationally moves around the second fulcrum, of the balancer part is required to satisfy the following expression 1.

$$m2 = \{(L1 \cdot L3)/(L2 \cdot L4)\} \cdot m1 \quad \text{Expression 1;}$$

When gravitational acceleration is defined as g, F1=m1·g and F2=m2·g are established.

When the weight of the balancer part is set in this way, as illustrated in FIG. 13, even when the entire system is inclined at an inclination θ, the cos components acting on the first and second fulcrum positions P2 and P5 become equal (F1·cos θ=F2·cos θ), so that the balance of the entire system is maintained.

In contrast, when the subject is brought into contact with the target, as illustrated in FIG. 14, force F4 acts at a contact point P6 of the subject and the target, and thereby, force in an upward direction A on the paper in FIG. 14 acts at the bending position P3 (universal joint 21 in the examples in FIGS. 1 to 8) of the intermediate part 2. As illustrated in FIG. 15, the subject surface of the subject follows the target surface of the target. At this time, the intermediate part expands (in the examples in FIGS. 1 to 8, the expansion/contraction part (expansion/contraction mechanism) 22 expands).

In the case where the intermediate part further includes a return part that returns the intermediate part to an original length before expansion/contraction when the intermediate part expands/contracts, for example, in the case where the intermediate part 2 includes the return spring 224 in the examples in FIGS. 1 to 8, when the subject is spaced apart from the target, as illustrated in FIG. 16, the return part (return spring 224) causes restoring force in an upward direction B on the paper in FIG. 16 to act at the bending position P3 (universal joint 21 in the examples in FIGS. 1 to 8) of the intermediate part. As a result, the entire system operates in the balancing direction. The profiling apparatus D returns to the posture of standby state in FIG. 12.

The profiling apparatus D in the embodiment operates in this way, and can thus be used not only in the vertical direction but in other directions, particularly in the horizontal direction.

The above-described profiling apparatus D satisfies the above-described expression 1. As mentioned above, in the case of the standby state where the subject S is held and the subject surface SA does not abut on the target surface, the profiling apparatus D can position the first fulcrum position P1, the first gravity center position P2, the bending position P3, the second fulcrum position P4, and the second gravity center position P5 on the same straight line, and balance the subject S and the holding part 1 and the balancer part 3.

The profiling apparatus D includes the return part (return spring 224 in the above-mentioned example). When the subject surface SA is detached from the target surface, the profiling apparatus D can return the postures of the holding part 1, the intermediate part 2, and the balancer part 3 to their original states. Even when the above-mentioned expression 1 is not completely satisfied, restoring force acting on the return part can balance (equalize) the holding part and the balancer part.

Since the first and second fulcrums are two linear and independent axes in two directions for rotational movement around the first axis and rotational movement around the second axis, in the above-mentioned example, the Y- and Z-axes, the above-described profiling apparatus D enables the subject surface SA to follow the target surface with two degrees of freedom.

The above-described profiling apparatus D further includes movement mechanisms 61 and 62 (62a and 62b) that move the holding part 1 in an attachment/detachment direction in which the target surface and the subject surface SA are attached/detached to/from each other. Consequently, the above-described profiling apparatus D enables the subject surface SA to follow the target surface with three degrees of freedom as a result of adding one additional degree of freedom. When the subject surface SA is made to follow the target surface, the above-describe profiling apparatus D can let the subject surface SA go in a direction in which the subject surface SA is spaced apart from the target surface. The profiling apparatus D can avoid the subject surface SA from applying impact and an overload on the target surface.

Figure 17:
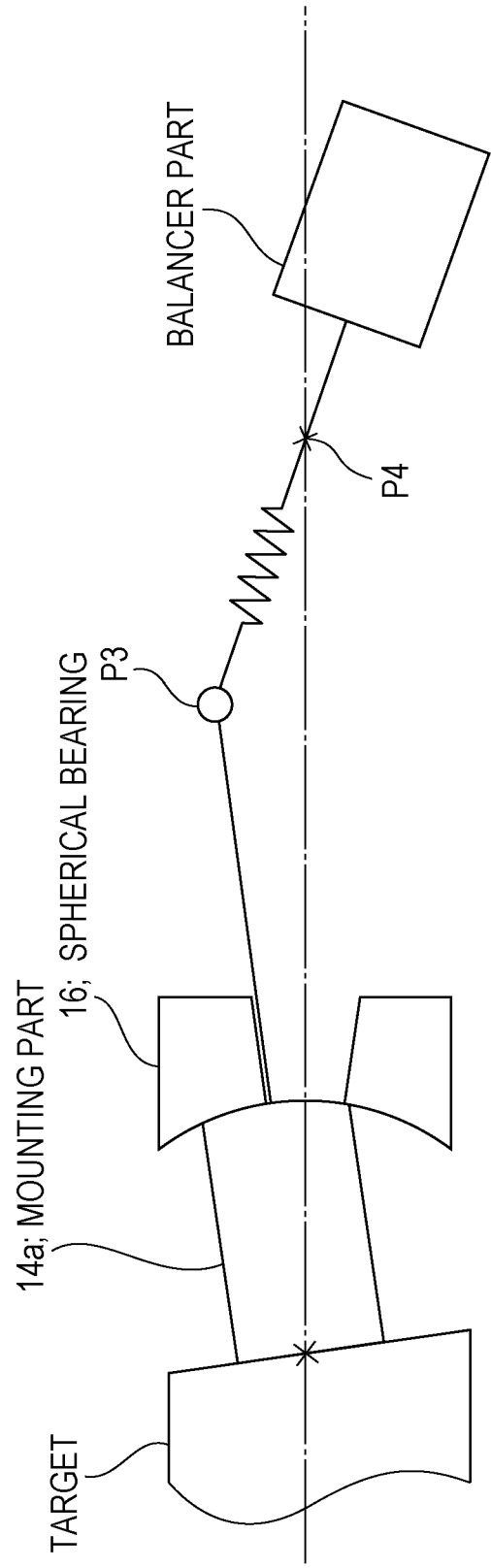
FIG. 17 illustrates a profiling apparatus of a first variation.

Although, in the above-mentioned profiling apparatus D, the mounting part 14 is supported by a so-called biaxial gimbal so as to rotationally move around each of two axes, the profiling apparatus D may be rotatably supported by a spherical bearing as illustrated in FIG. 17. FIG. 17 illustrates a profiling apparatus according to a first variation. In this case, a mounting part 14a is, for example, a box-shaped housing that houses the subject S. The mounting part 14a has a spherical shape in which the other side surface of the box-shaped housing corresponds to the spherical shape of a spherical bearing 16. Magnets (not illustrated) are disposed such that magnetic force attracting each of the mounting part 14a and the spherical bearing 16 acts on each other. This slidably holds the mounting part 14a on the spherical bearing 16. The spherical bearing 16 is disposed on the first base plate 4 by being fixedly attached on the first base plate 4. The universal joint 21 of the intermediate part 2 is fixedly attached on the spherical bearing 16.

Figure 18:
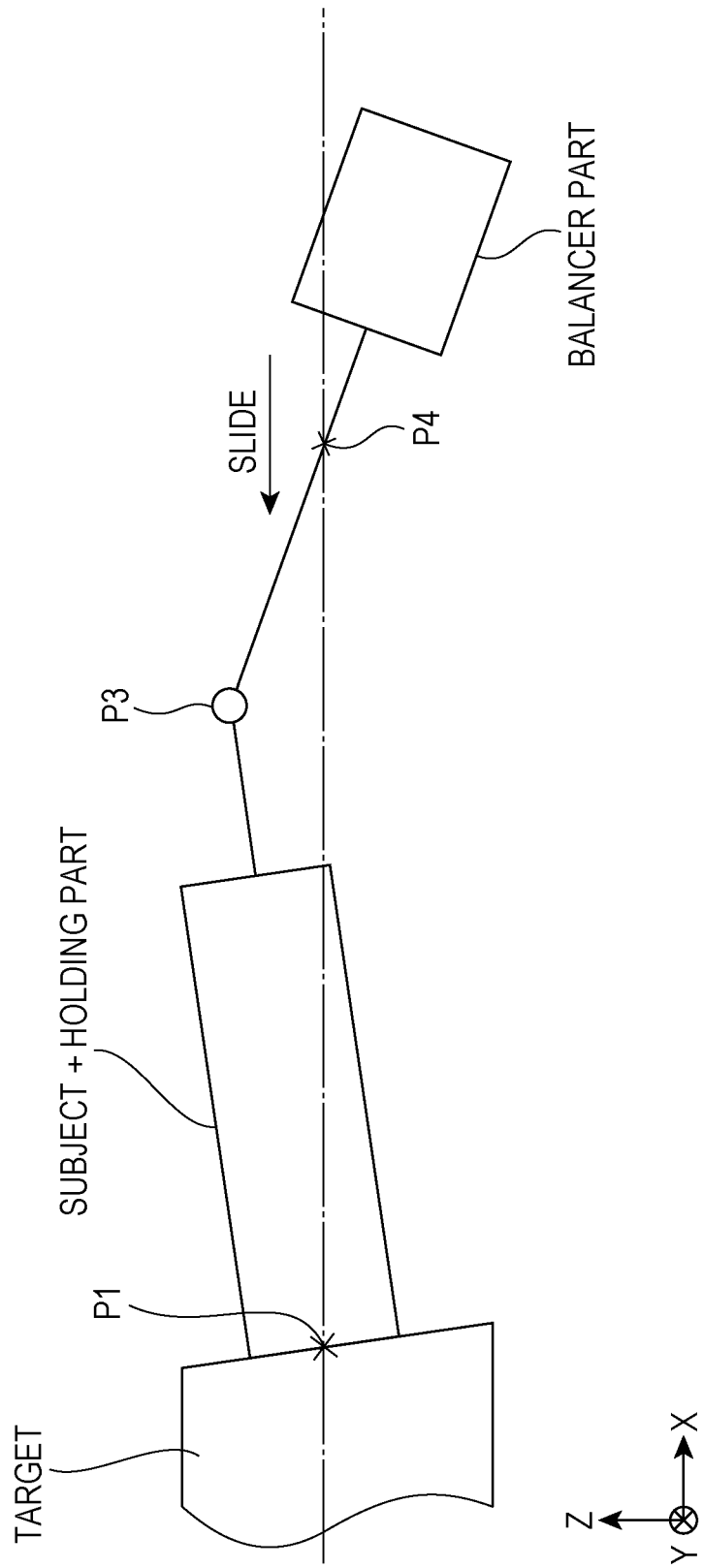
FIG. 18 illustrates a profiling apparatus of a second variation.

Although, in the above-mentioned profiling apparatus D, the expansion/contraction part (expansion/contraction mechanism) 22 is provided in the intermediate part 2, a mechanism in which the second fulcrum position P4 slides in the X-axis direction may be provided as illustrated in FIG. 18. FIG. 18 illustrates a profiling apparatus of a second variation. In this case, a guide rail (not illustrated) is disposed such that the second fulcrum position P4 slides in the X-axis direction. When this rotationally moves the holding part 1 around the first fulcrum, force in the −X-axis direction (left direction on the paper) acts on the second fulcrum, and the second fulcrum position P4 is guided to the guide rail to slide. The guide rail is fixedly attached to the first base plate 4. The second leg part 32 is held on the guide rail so as to slide in the X-axis direction.

Although the specification discloses techniques of various aspects described above, the main techniques of these techniques are summarized below.

A profiling apparatus according to one aspect causes a subject surface of a subject to follow a target surface of a target, and the profiling apparatus includes: a holding part that rotationally moves around a first fulcrum, and holds the subject; an intermediate part that is coupled to the holding part at one end, and has a degree of freedom except a coupling direction; and a balancer part that is coupled to another end of the intermediate part, and rotationally moves around a second fulcrum different from the first fulcrum, and there a first fulcrum position of the first fulcrum, a first gravity center position, a bending position, and a second gravity center position are aligned in this order. The first gravity center position corresponds to a gravity center of a part, which rotationally moves around the first fulcrum, of the subject and the holding part in the case where the subject is held. The bending position corresponds to a bending point of the intermediate part. The second gravity center position corresponds to a gravity center of a part, which rotationally moves around the second fulcrum, of the second fulcrum position and the balancer part. In the above-mentioned profiling apparatus, the intermediate part is preferably an elastic rubber body formed in a cylindrical or tubular shape. In the above-mentioned profiling apparatus, the intermediate part preferably includes a universal joint and an expansion/contraction part (expansion/contraction mechanism). The universal joint is coupled to the holding part at one end, and bends in any direction orthogonal to the coupling direction. The expansion/contraction part (expansion/contraction mechanism) is coupled to the other end of the universal joint, and expands and contracts along the coupling direction.

In such a profiling apparatus, the first fulcrum position and the first gravity center position are aligned in this order, and thus the first fulcrum position and the first gravity center position do not coincide with each other. When the profiling apparatus is used in a direction in which the first fulcrum position and the first gravity center position are not aligned on a vertical line, for example, in the horizontal direction, the subject and the holding part rotationally move around the first fulcrum by their own weights. Here, in the above-described profiling apparatus, the first fulcrum position, the first gravity center position, the bending position, the second fulcrum position, and the second gravity center position are aligned in this order. The balancer part that rotationally moves around the second fulcrum is coupled to the holding part via the intermediate part. Thus, even when the subject and the holding part rotationally move around the first fulcrum by their own weights, the rotational movement can be stopped at the position where the subject surface follows the target surface. The above-described profiling apparatus can thus be used not only in the vertical direction but in other directions, particularly in the horizontal direction.

In another aspect, in the above-described profiling apparatus, the first fulcrum position of the first fulcrum, the first gravity center position, the bending position, and the second gravity center position are set in a balanced positional relation. The first gravity center position corresponds to a gravity center of a part, which rotationally moves around the first fulcrum, of the subject and the holding part in the case where the subject is held. The bending position corresponds to a bending point of the intermediate part. The second gravity center position corresponds to a gravity center of a part, which rotationally moves around the second fulcrum, of the second fulcrum position and the balancer part.

In another aspect, in the above-described profiling apparatus, mass m2 of a part, which rotationally moves around the second fulcrum, of the balancer part satisfies the following expression 1, in a case where, a load acting on the first gravity center position is defined as F1, a first distance from the first fulcrum position to the first gravity center position is defined as L1, a second distance from the first gravity center position to the bending position is defined as L2, a third distance from the bending position to the second fulcrum position is defined as L3, a fourth distance from the second fulcrum position to the second gravity center position is defined as L4, and mass of a part, which rotationally moves around the first fulcrum, of the subject and the holding part in a case where the subject is held is defined as m1.

$$m2=\{(L1 \cdot L3)/(L2 \cdot L4)\} \cdot m1 \quad \text{Expression 1;}$$

The profiling apparatus as described above satisfies the above-described expression 1. In the case of the standby state where the subject is held and the subject surface does not abut on the target surface, the profiling apparatus can position the first fulcrum position, the first gravity center position, the bending position, the second fulcrum position, and the second gravity center position on the same straight line, and balance (equalize) the subject and the holding part and the balancer part.

In another aspect, in these above-mentioned profiling apparatuses, the first and second fulcrums are two linear and independent axes in two directions for rotational movement around a first axis and rotational movement around a second axis. Preferably, the above-mentioned profiling apparatus further includes a plate-shaped base plate. The holding part includes a first leg part, a first annular part, a second annular part, and a mounting part. The first leg part stands on the base plate. The first annular part rotationally moves around the first axis of the first fulcrum with respect to the first leg part. The second annular part rotationally moves around the second axis of the first fulcrum with respect to the first annular part. The mounting part is coupled to the first or second annular part, extends in a coupling direction orthogonal to each of the first and second axes, and holds the subject. Preferably, the first leg part includes a pair of first and second sub leg parts spaced apart and standing on the base plate, and the mounting part is disposed between the first and second sub leg parts. Preferably, the above-mentioned profiling apparatus further includes a plate-shaped base plate. The balancer part includes a second leg part, a rotationally moving part, an arm part, and a weight. The second leg part stands on the base plate. The rotationally moving part rotationally moves around the second axis of the second fulcrum with respect to the second leg part. The arm part rotationally moves around the first axis of the second fulcrum with respect to the rotationally moving part, and extends along the coupling direction. The weight is coupled to the arm part.

Such a profiling apparatus can cause a subject surface to follow a target surface with two degrees of freedom.

In another aspect, in the above-mentioned profiling apparatus, the intermediate part further includes a return part that returns the intermediate part from a bending posture to an original posture. Preferably, in the above-mentioned profiling apparatus, the return part is a coil spring (return spring).

When the subject surface is detached from the target surface, such a profiling apparatus can return the postures of the holding part, the intermediate part, and the balancer part to their original states. Even when the above-mentioned expression 1 is not completely satisfied, restoring force acting on the return part can balance (equalize) the holding part and the balancer part.

In another aspect, the above-mentioned profiling apparatus further includes a movement mechanism that moves the holding part in an attachment/detachment direction in which the target surface and the subject surface are attached/detached to/from each other. Preferably, the above-mentioned profiling apparatus further includes a plate-shaped first and second base plates. The holding part, the intermediate part, and the balancer part are mounted on the first base plate. The movement mechanism includes a guide rail and a sliding part. The guide rail extends in the attachment/detachment direction, and disposed on the second base plate. The sliding part is slidably attached to the guide rail, and attached to the first base plate.

Such a profiling apparatus can cause a subject surface to follow a target surface with three degrees of freedom. When the subject surface is made to follow the target surface, the above-describe profiling apparatus can let the subject surface go in a direction in which the subject surface is spaced apart from the target surface. The profiling apparatus can avoid the subject surface from applying impact and an overload on the target surface.

In another aspect, these above-mentioned profiling apparatus further include a second balancer part that maintains a load generated by gravity in accordance with postures of the subject and the holding part, the intermediate part, and the balancer part in the case where the subject is held.

Such a profiling apparatus further includes the second balancer part, and can be used in any posture.

In another aspect, these above-mentioned profiling apparatuses further include the subject, and there, the subject is an optical characteristic measuring device that measures a predetermined optical characteristic. Preferably, in the above-mentioned profiling apparatus, the optical characteristic measuring device includes a luminance meter for measuring luminance, a colorimeter for measuring color, or a color luminance meter for measuring color and luminance Preferably, the optical characteristic measuring device includes a rectangular parallelepiped box-shaped housing. One end surface of the box-shaped housing has a curved surface protruding outward. A measurement opening is formed on the top of the curved surface. The measurement opening faces a measurement surface of a measurement target, and receives measurement light from the measurement surface. The subject surface corresponds to an opening surface of the measurement opening.

In this way, a profiling apparatus holding a subject can be provided. In particular, when the subject is an optical characteristic measuring device, optical characteristics generally need to be measured with a geometry that has been preliminarily defined by, for example, a standard. The subject surface (opening surface of a measurement opening in the optical characteristic measuring device) can be made to follow a target surface (measurement surface). The optical characteristics can be measured with the geometry, and can be measured with higher accuracy.

This application is based on Japanese Patent Application No. 2018-21585 filed on Feb. 9, 2018, and the content thereof is included in the present application.

Although the embodiment of the invention has been illustrated and described in detail, the embodiment is only an illustrative and practical example, and not a limitation. The scope of the invention should be construed in accordance with the literal languages of the appended claims.

Although, in order to represent the invention, the invention has been described above appropriately and sufficiently through the embodiment with reference to the drawings, it should be recognized that those skilled in the art can easily modify and/or improve the above-mentioned embodiment. Unless a modification or improvement carried out by those skilled in the art is at a level that deviates from the scope of rights of the claims set forth in the claims, the modification or improvement is interpreted to be included in the scope of rights of the claims.

INDUSTRIAL APPLICABILITY

According to the invention, there can be provided a profiling apparatus that causes a subject surface of a subject to follow a target surface of a target.

The invention claimed is:

1. A profiling apparatus that causes a subject surface of a subject to follow a target surface of a target, the profiling apparatus comprising:
   a holding part that rotationally moves around a first fulcrum, and holds the subject;
   an intermediate part that is coupled to the holding part at one end, and has a degree of freedom except a coupling direction; and
   a balancer part that is coupled to another end of the intermediate part, and rotationally moves around a second fulcrum different from the first fulcrum,
   wherein a first fulcrum position of the first fulcrum,
   a first gravity center position,
   a bending position, and
   a second gravity center position are aligned in this order,
   the first gravity center position corresponding to a gravity center of a part, which rotationally moves around the first fulcrum, of the subject and the holding part in a case where the subject is held,
   the bending position corresponding to a bending point of the intermediate part,
   the second gravity center position corresponding to a gravity center of a part, which rotationally moves around the second fulcrum, of the second fulcrum position and the balancer part.

2. The profiling apparatus according to claim 1, wherein the first fulcrum position of the first fulcrum, the first gravity center position, the bending position, and the second gravity center position are set in a balanced positional relation, the first gravity center position corresponding to a gravity center of a part, which rotationally moves around the first fulcrum, of the subject and the holding part in a case where the subject is held, the bending position corresponding to a bending point of the intermediate part, the second gravity center position corresponding to a gravity center of a part, which rotationally moves around the second fulcrum, of the second fulcrum position and the balancer part.

3. The profiling apparatus according to claim 2, wherein mass $m2$ of a part, which rotationally moves around the second fulcrum, of the balancer part satisfies a following expression 1:

$$m2=\{(L1 \cdot L3)/(L2 \cdot L4)\} \cdot m1 \quad \text{Expression 1;}$$

where a load acting on the first gravity center position is defined as $F1$, a first distance from the first fulcrum position to the first gravity center position is defined as $L1$, a second distance from the first gravity center position to the bending position is defined as $L2$, a third distance from the bending position to the second fulcrum position is defined as $L3$, a fourth distance from the second fulcrum position to the second gravity center position is defined as $L4$, and mass of a part, which rotationally moves around the first fulcrum, of the subject and the holding part in a case where the subject is held is defined as $m1$.

4. The profiling apparatus according to claim 1, wherein the first and second fulcrums are two linear and independent axes in two directions for rotational movement around a first axis and rotational movement around a second axis.

5. The profiling apparatus according to claim 1, wherein the intermediate part further includes a return part that returns the intermediate part from a bending posture to an original posture.

6. The profiling apparatus according to claim 1, further comprising a movement mechanism that moves the holding part in an attachment/detachment direction in which the target surface and the subject surface are attached/detached to/from each other.

7. The profiling apparatus according to claim 1, further comprising a second balancer part that maintains a load generated by gravity in accordance with postures of the subject and the holding part, the intermediate part, and the balancer part in a case where the subject is held.

8. The profiling apparatus according to claim 1, further comprising the subject,
   wherein the subject is an optical characteristic measuring device that measures a predetermined optical characteristic.

9. The profiling apparatus according to claim 2,
   wherein the first and second fulcrums are two linear and independent axes in two directions for rotational movement around a first axis and rotational movement around a second axis.

10. The profiling apparatus according to claim 2,
    wherein the intermediate part further includes a return part that returns the intermediate part from a bending posture to an original posture.

11. The profiling apparatus according to claim 2, further comprising a movement mechanism that moves the holding part in an attachment/detachment direction in which the target surface and the subject surface are attached/detached to/from each other.

12. The profiling apparatus according to claim 2, further comprising a second balancer part that maintains a load generated by gravity in accordance with postures of the subject and the holding part, the intermediate part, and the balancer part in a case where the subject is held.

13. The profiling apparatus according to claim 2, further comprising the subject,
    wherein the subject is an optical characteristic measuring device that measures a predetermined optical characteristic.

14. The profiling apparatus according to claim 3,
    wherein the first and second fulcrums are two linear and independent axes in two directions for rotational movement around a first axis and rotational movement around a second axis.

15. The profiling apparatus according to claim 3,
    wherein the intermediate part further includes a return part that returns the intermediate part from a bending posture to an original posture.

16. The profiling apparatus according to claim 3, further comprising a movement mechanism that moves the holding part in an attachment/detachment direction in which the target surface and the subject surface are attached/detached to/from each other.

17. The profiling apparatus according to claim 3, further comprising a second balancer part that maintains a load generated by gravity in accordance with postures of the subject and the holding part, the intermediate part, and the balancer part in a case where the subject is held.

18. The profiling apparatus according to claim 3, further comprising the subject,
wherein the subject is an optical characteristic measuring device that measures a predetermined optical characteristic.

19. The profiling apparatus according to claim 4,
wherein the intermediate part further includes a return part that returns the intermediate part from a bending posture to an original posture.

20. The profiling apparatus according to claim 4, further comprising a movement mechanism that moves the holding part in an attachment/detachment direction in which the target surface and the subject surface are attached/detached to/from each other.

\* \* \* \* \*